(12) United States Patent  (10) Patent No.: US 8,129,685 B2
Nakamura et al.  (45) Date of Patent: Mar. 6, 2012

(54) FLUORESCENT MATERIAL, SCINTILLATOR USING SAME, AND RADIATION DETECTOR USING SAME

(75) Inventors: Ryouhei Nakamura, Tokorozawa (JP); Shunsuke Ueda, Ibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 445 days.

(21) Appl. No.: 12/512,840

(22) Filed: Jul. 30, 2009

(65) Prior Publication Data

US 2010/0059681 A1 Mar. 11, 2010

(30) Foreign Application Priority Data

Jul. 31, 2008 (JP) .................................. 2008-197149
Apr. 7, 2009 (JP) .................................. 2009-093318

(51) Int. Cl.
*G01T 1/20* (2006.01)
*G01J 1/58* (2006.01)

(52) U.S. Cl. .......... 250/361 R; 250/363.01; 250/363.02; 250/363.04; 250/458.1; 250/370.09; 250/370.11; 252/301.4 R; 252/301.4 F

(58) Field of Classification Search .............. 250/361 R, 250/362, 363.01, 363.02, 458.1, 459.1, 370.11, 250/370.09, 370.12, 301.4 R; 252/301.4 R, 252/301.4 F See application file for complete search history.

(56) References Cited

U.S. PATENT DOCUMENTS 7,115,217 B2 * 10/2006 Kummer et al. ......... 252/301.36
7,252,789 B2 * 8/2007 Venkataramani et al. ....................... 252/301.4 R
2006/0219927 A1 10/2006 Venkataramani et al.
2008/0017802 A1 1/2008 Nakamura et al.
2010/0187423 A1 * 7/2010 Nakamura et al. ........ 250/361 R

FOREIGN PATENT DOCUMENTS

| JP | 2001-4753 A | 1/2001 |
| JP | 2001-183463 A | 7/2001 |
| JP | 2001-294853 A | 10/2001 |
| JP | 2001-303048 A | 10/2001 |
| JP | 2002-189080 A | 7/2002 |
| JP | 2003-119070 A | 4/2003 |
| WO | WO-99/33934 A1 | 7/1999 |

* cited by examiner

*Primary Examiner* — David Porta
*Assistant Examiner* — Yara Green
(74) *Attorney, Agent, or Firm* — Birch, Stewart, Kolasch & Birch, LLP

(57) ABSTRACT

Problem:
The problem is to provide a fluorescent material for a scintillator to be used in a radiation detector. In view of this, the fluorescent material must have a high fluorescent intensity and a low level of afterglow 1 to 300 ms after the termination of X-ray radiation.
Solution:
The above problem is solved in that the above fluorescent material contains Ce as an activator. In addition, the material contain at least Gd, Al, Ga, O, Si, and a component M. The component M is at least one of Mg, Ti, and Ni. In addition, the composition of the material must be expressed by the general formula:

$$(Gd_{1-x-z}Lu_xCe_z)_{3+a}(Al_{1-u-s}Ga_uSc_s)_{5-a}O_{12}$$

wherein $0 \leq a \leq 0.15$, $0 \leq x \leq 0.5$, $0.0003 \leq z \leq 0.0167$, $0.2 \leq u \leq 0.6$, and $0 \leq s \leq 0.1$, and wherein, regarding the concentrations of Si and M, $0.5 \leq$ Si concentration (mass ppm) $\leq 10$, and $0 \leq$ M concentration (mass ppm) $\leq 50$.

20 Claims, 16 Drawing Sheets

FLUORESCENT MATERIAL, SCINTILLATOR USING SAME, AND RADIATION DETECTOR USING SAME

TECHNICAL FIELD

The present invention relates to a fluorescent material configured to absorb radiation such as X-rays and emit fluorescence. The present invention also relates to a scintillator using such a fluorescent material. The present invention also relates to a radiation detector using such a fluorescent material.

BACKGROUND ART

One example of an X-ray diagnostic device is an X-ray CT (Computed Tomography) scanner. This CT scanner is composed of an X-ray tube and an X-ray detector. The tube is designed to emit a fan-shaped beam of X-rays, i.e., an X-ray fan beam. The detector is composed of many X-ray detecting elements arrayed side-by-side. The scanner operates as follows: The X-ray tube emits a series of X-ray fan beams one after another onto the X-ray detector. Each time a fan beam is incident on the surface a tomographic layer, it is oriented at a predetermined angle, for example, 1 degree, from the previous one. The scanner collects thereby data on absorptions of X-rays. Subsequently, the data is analyzed by a computer. An absorptance at an individual location on the surface of a tomographic section is thereby calculated. An image is thereby formed according to the absorptances.

Conventionally, as this X-ray detector, a xenon gas detector has been used. This detector operates as follows: The detector has a gas chamber filled with a xenon gas. This detector has many electrodes arrayed therein. First, a voltage is applied between each pair of electrodes. Subsequently, the detector is irradiated by X-rays. The xenon gas is thereby ionized. A current signal is thereby output. The level of the signal corresponds to the intensity of the emission of X-rays. This enables an image to be formed. However, the interior pressure of the xenon gas filled chamber is high. Therefore, the window of the chamber must be thick. This decreases use efficiency of X-rays. In addition, in order to obtain a high resolution CT scanner, the thickness of an electrode plate must be very small. However, if the electrode plate is thin, vibration from the exterior vibrates the electrode plate. This generates noise. This constitutes a problem.

On the other hand, the following type of X-ray detector has been developed and has been put to practical use. The detector is composed of a specific type of scintillator and of a silicon photodiode. The scintillator is made of a fluorescent material such as a $CdWO_4$ single crystal, a $(Y, Gd)_2O_3$:Eu, Pr ceramic, a $Gd_2O_2S$:Pr, Ce, F ceramic (referred to as "GOS:Pr" hereinafter), or a polycrystalline ceramic made of an oxide (referred to as "GGAG:Ce" hereinafter) having a garnet structure primarily containing gadolinium oxide, gallium oxide, and aluminum oxide, and cerium oxide. In this X-ray detector, when absorbing X-rays, the scintillator emits fluorescent light. Subsequently, the silicon photodiode detects this light. Thus, X-rays are detected. The fluorescent material constituting the scintillator emits light having a wavelength corresponding to an energy level produced by an activator element added to the matrix thereof. If this wavelength is not smaller than 500 nm and corresponds to a visible light, this causes the silicon photodiode to acquire high detection efficiency. This in turn causes the X-ray detector to acquire particularly high sensitivity.

A compositional formula expressing a fluorescent material contains the colon ":". A matrix is indicated on the left side thereof. An activator ion is indicated on the right side thereof. If an X-ray detector is formed by using such materials, this makes it possible to miniaturize an X-ray detecting element, to increase the number of channels and to obtain a high resolution image. In general, such a fluorescent material is required to be a highly homogenous material, to vary little from one piece thereof to another in the X-ray characteristics, to be little deteriorated by radiation, to keep the fluorescence characteristics substantially unchanged when environmental conditions such as temperature are changed, to be easy to machine, to be hardly deteriorated by machining, to absorb substantially no moisture, to be not deliquescent, to be chemically stable, etc.

In this type of X-ray detector, the more a scintillator absorbs X-rays, the higher the light intensity (referred to also as the "fluorescence intensity" hereinafter). The higher the light intensity becomes, the higher the sensitivity of the detector. Thus, the high intensity of fluorescence requires absorbing X-rays sufficiently. Given a constant amount of X-ray radiation, the less a scintillator absorbs X-rays, the more the scintillator transmits X-rays. This causes noise in a silicon photodiode. This in turn decreases the sensitivity. The amount of transmission of X-rays through a scintillator may be decreased by increasing the thickness of the scintillator. However, an increase in the thickness thereof hinders miniaturization of an X-ray detecting element. This increases the cost. Therefore, it is desirable that a fluorescent material be thin and have a large X-ray absorption coefficient. In addition, the lower the light transmittance in a fluorescent material, the less likely the emitted light reaches the silicon photodiode. This substantially decreases the fluorescence intensity. Therefore, in order to obtain high fluorescence intensity, a fluorescent material to be used as a scintillator is required (1) to have a large X-ray absorptance and (2) to have a high light transmittance for fluorescent light.

First, high resolution is required in X-ray computed tomography. High resolution may be achieved by miniaturizing an X-ray detecting element. Second, X-ray CT must avoid effects due to movements of the subject. This may be achieved by shortening scan time. All this causes an X-ray detecting element to have a shortened integration time. This in turn causes the total amount of absorbed X-rays within an integration time to be decreased. This makes high fluorescence efficiency (high fluorescence intensity) necessary. The time resolution of an X-ray detecting element may be increased in that the intensity of fluorescence (afterglow) after the termination of X-ray radiation decreases instantaneously and considerably. This requires a small time constant for the decay of fluorescence and a low level of afterglow. The fluorescence decay time constant refers to a time period in which the intensity of fluorescence after the termination of X-ray radiation has decayed to 1/e of the intensity of fluorescence during X-ray radiation. The level of afterglow is the ratio of the fluorescent intensity a predetermined time after the termination of X-ray radiation to the fluorescent intensity during X-ray radiation. If the decay occurred perfectly exponentially, a decrease in the decay time constant would necessarily cause a decrease in the level of afterglow. However, actually, the level of afterglow does not decrease exponentially. Therefore, a high-performance X-ray CT scanner with the low level of afterglow requires a fluorescent material that has a small decay time constant and the low level of afterglow. Table 1 shows the fluorescence intensity, the decay time constant, and the level of afterglow 30 ms after the termination of X-ray radiation for various types of fluorescent materials that have been conventionally used.

TABLE 1

| Composition | Material | Density | Fluorescence Intensity | Decay Time Constant ($\mu$s) | Afterglow (% at 30 ms) |
|---|---|---|---|---|---|
| $CdWO_4$ | Singlecrystal | 7.99 | 56 | 5.0 | 0.002 |
| $Gd_2O_2S$:Pr, Ce, F | Polycrystal | 7.28 | 100 | 3.0 | 0.01 |
| $(Y, Gd)_2O_3$:Eu, Pr | Polycrystal | 5.92 | 100 | 1000 | 0.01 |
| $Gd_3Ga_5O_{12}$:Cr, Ce | Polycrystal | 7.09 | 72 | 140 | 0.01 |
| $Gd_3Al_3Ga_2O_{12}$:Ce | Polycrystal | 6.46 | 95 | appr. 0.1 | 0.01 |

Footnote 1: The fluorescence intensity, the decay time constant, the level of afterglow were measured using a silicon photodiode (S2281 manufactured by Hamamatsu Photonics)
Footnote 2: The fluorescence intensity is an relative value with reference to the fluorescence intensity of $Gd^2O^2S$:Pr, Ce, F.

Among the above materials, $Gd_3Al_3Ga_2O_{12}$:Ce (GGAG: Ce) emits fluorescent light. This occurs in that Ce acts as an activator Ce. That is, this is caused by the allowed transition of $Ce^{3+}$ from 5d level to 4f level. Therefore, Patent Documents 1 to 7 disclose a polycrystalline material made of GGAG:Ce as a fluorescent material.

Among the above patent documents, Patent Documents 6 and 7 specify, in particular, the content of Si in GGAG:Ce. Patent Document 6 discloses a GGAG:Ce scintillator containing 0.001 to 5.0 (excluding 0.001 and 5.0) mol of the group IVb elements including Si, in terms of molar ratio. Patent Document 7 discloses a GGAG:Ce scintillator containing smaller than 100 ppm of Si by weight. The decreased content of Si is due to the increased light transmittance and the decreased level of afterglow.

PRIOR ART DOCUMENTS

Patent Documents

Patent Document 1: Japanese Patent Publication No. 2001-4753
Patent Document 2: Japanese Patent Publication No. 2003-119070
Patent Document 3: Japanese Patent No. 3938470
Patent Document 4: Japanese Patent Publication No. 2002-189080
Patent Document 5: Japanese Patent Publication No. 2001-303048
Patent Document 6: Japanese Patent Publication No. 2001-294853
Patent Document 7: Japanese Patent Publication No. 2001-183463

SUMMARY OF THE INVENTION

Problems to be Solved by the Invention

Recently, newer high-performance X-ray CT scanners usually have shorter scan times. The reason for this is to avoid effects due to movements of the subject, to obtain an image having a high-resolution tomographic layer, and to minimize the amount of exposure dose. It has been proposed that the level of afterglow 1 to 300 ms after the termination of X-ray radiation be substantially increased. The above GGAG:Ce polycrystalline material has a fluorescence decay time constant of approximately 100 ns. This is a very small value. This is due to use of fluorescence caused by $Ce^{3+}$. However, this material has a problem of a comparatively high level of afterglow. The present invention has been conceived in view of this problem.

The object of the present invention is to solve the above problems.

Means for Solving the Problems

According to the present invention, the above problems are solved by a fluorescent material comprising Ce as an activator and further comprising at least Gd, Al, Ga, O, Si, and a component M, wherein the component M is at least one of Mg, Ti, Ni. The composition of the fluorescent material is expressed by the general formula:

$$(Gd_{1-x-z}Lu_xCe_z)_{3+a}(Al_{1-u-s}Ga_uSc_s)_{5-a}O_{12}$$

wherein
$0 \leq a \leq 0.15$
$0 \leq x \leq 0.5$,
$0.0003 \leq z \leq 0.0167$,
$0.2 \leq u \leq 0.6$, and
$0 \leq s \leq 0.1$,
and wherein, regarding the concentrations of Si and the component M,
$0.5 \leq$ Si concentration (mass ppm) $\leq 10$, and
$0 \leq$ M concentration (mass ppm) $\leq 50$.

According to a preferable aspect of the present invention, for the value a, $0.005 \leq a \leq 0.05$.

According to another preferable aspect of the present invention, for the value x, $0.03 \leq x \leq 0.2$.

According to yet another preferable aspect of the present invention, for the value z, $0.001 \leq z \leq 0.005$.

According to yet another preferable aspect of the present invention, for the value u, $0.35 \leq u \leq 0.55$.

According to yet another preferable aspect of the present invention, for the value s, $0.01 \leq s \leq 0.1$.

According to yet another preferable aspect of the present invention, $0.5 \leq$ Si concentration (mass ppm) $\leq 5$.

According to yet another preferable aspect of the present invention, $3 \leq$ M concentration (mass ppm) $\leq 15$.

The present invention also relates to a fluorescent material for a scintillator having a garnet structure, the material comprising Ce, Gd, Ga, Al, O, Si, and a component M, wherein Ce acts as an activator. The fluorescent material is designed to include:
$24.3 \leq$ Gd concentration (mass %) $\leq 57.6$,
$0 \leq$ Lu concentration (mass %) $\leq 31.1$,
$0.02 \leq$ Ce concentration (mass %) $\leq 0.7$,
$4.0 \leq$ Al concentration (mass %) $\leq 12.8$,
$7.5 \leq$ Ga concentration (mass %) $\leq 22.6$,
$0 \leq$ Sc concentration (mass %) $\leq 2.64$,
$19.6 \leq$ O concentration (mass %) $\leq 22.8$,
$0.5 \leq$ Si concentration (mass ppm) $\leq 10$, and
$0 \leq$ M concentration (mass ppm) $\leq 50$,
wherein the component M is at least one of Mg, Ti, and Ni, and wherein the sum of all the elements is set at 100 mass %.

The present invention also relates to a fluorescent material for a scintillator having a garnet structure, the material comprising Ce, Gd, Ga, Al, O, Si, and a component M, wherein Ce acts as an activator. The fluorescent material is designed to include:

45.9≦Gd concentration (mass %)≦52.8,
1.7≦Lu concentration (mass %)≦12.0,
0.06≦Ce concentration (mass %)≦0.24,
7.0≦Al concentration (mass %)≦10.0,
13.7≦Ga concentration (mass %)≦20.6,
0.05≦Sc concentration (mass≦0.5,
20.7≦O concentration (mass %)≦21.9,
0.5≦Si concentration (mass ppm)≦5, and
3≦M concentration (mass ppm)≦15;
that the component M is at least one of Mg, Ti, and Ni; and that the sum of all the elements is set at 100 mass %.

According to an aspect of the present invention, the above fluorescent material is polycrystalline.

According to another aspect of the present invention, a scintillator is made of the above fluorescent material.

According to yet another aspect of the present invention, the above scintillator is designed to have a thickness of 0.5 to 5 mm.

The present invention also relates to a radiation detector designed to comprise the above scintillator and a light receiving element, wherein the light receiving element is designed to detect fluorescent light emitted from the scintillator.

Advantageous Effect of the Invention

A fluorescent material according to the present invention is able to provide a scintillator having a low level of afterglow 1 to 300 ms after the termination of X-ray radiation, as compared with a conventional fluorescent material of GGAG:Ce. A radiation detector according to the present invention, formed using such a fluorescent material as a scintillator, has a shorter scan time. The detector may contribute thereby to increased resolution. The detector may also have stable detection performance.

BEST MODE FOR CARRYING OUT THE PRESENT INVENTION

The inventor studied in detail the cause of the above problem. It was thereby found that when a fluorescent material of GGAG:Ce was excited by a predetermined light, thereby producing an afterglow spectrum, the wavelength component of 450 to 650 nm therein was correlated with the afterglow of the fluorescent material. This enabled the inventor to achieve the present invention.

The afterglow from X-ray excitation is proportional to the afterglow from ultraviolet ray excitation. In view of this, a study was conducted to find out why the level of afterglow increases by use of a fluorescence spectrophotometer (F4500 manufactured by Hitachi Co. Ltd.). First, an excitation wavelength was fixed at 266 nm Subsequently, an afterglow profile for each of various excitation wavelengths was measured. Subsequently, a curve was plotted from the points each representing the intensity of afterglow 3 ms after the termination of X-ray radiation for each excitation wavelength. Thus, an afterglow spectrum was determined.

Figure 1:
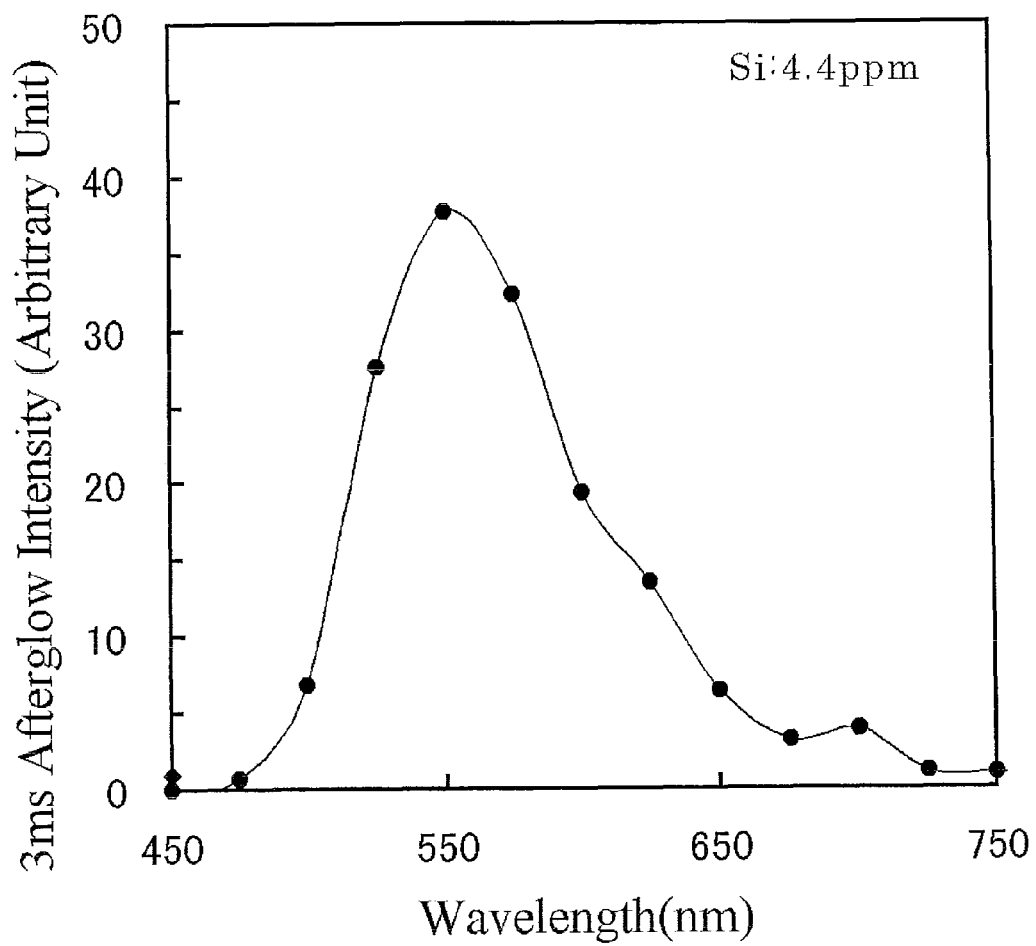
FIG. 1 is a schematic diagram of an afterglow spectrum of a fluorescent material according to the present invention.

FIG. 1 is a spectral diagram of an afterglow from a polycrystalline sample of GGAG:Ce, the sample sintered using an HIP sintering method, 3 ms after the termination of X-ray radiation. As can be seen from FIG. 1, the afterglow peaks at 500 nm. In addition, the afterglow has a spectrum having a range of wavelengths of 450 nm to 650 nm. In view of this, the inventor studied the cause of fluorescence at this wavelength range. For example, this polycrystalline sample contained 4.4 mass ppm of Si. It was found that fluorescence at this wavelength range was caused by such a trace of Si incorporated in a garnet crystal.

Figure 2:
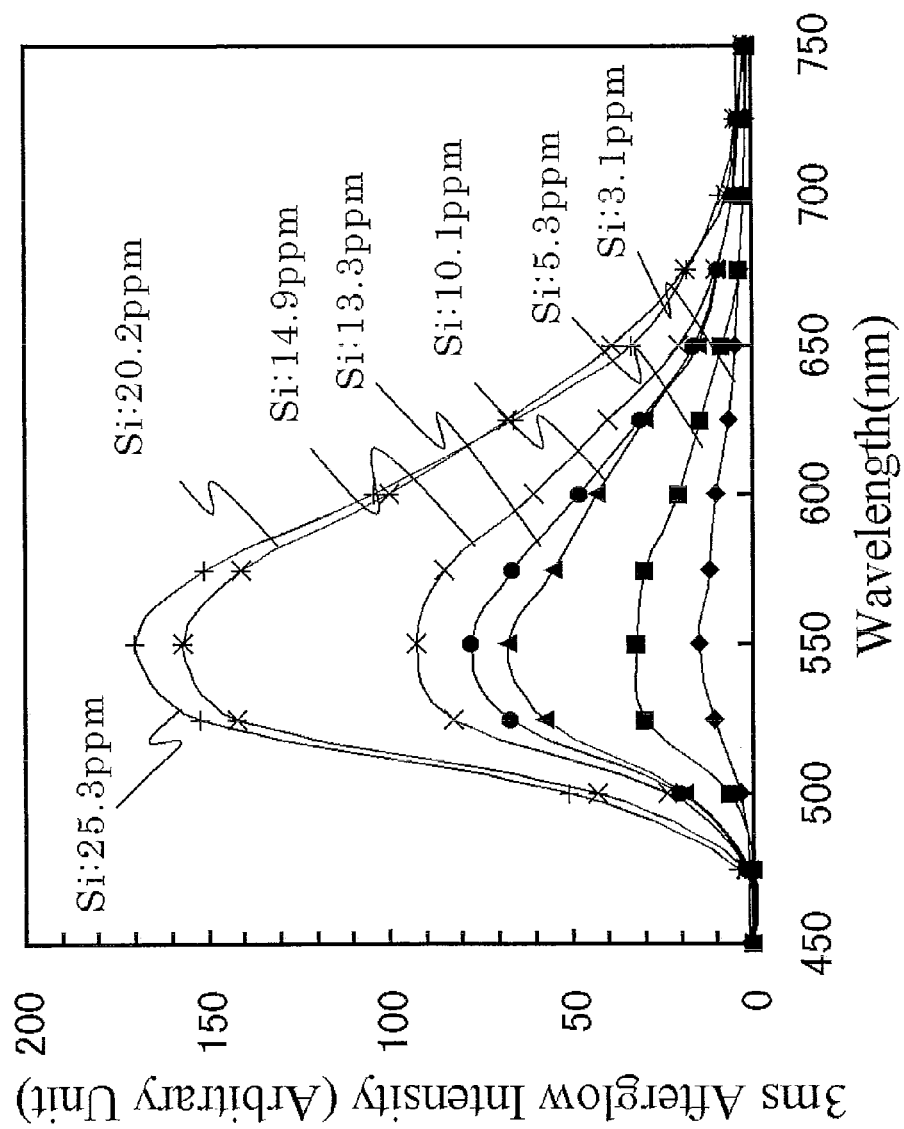
FIG. 2 is a schematic diagram of afterglow spectra of fluorescent materials having different contents of Si.

FIG. 2 is a spectral diagram of an afterglow from a sample formed by adding intentionally a specified amount of Si in the form of alkoxide to a raw material of GGAG:Ce and then by sintering the resultant product using an HIP sintering method. The content of Si in the figure is not an additive rate. That is an analytical value. This value is obtained by analyzing using a GDMS method (Glow Discharge Mass Spectrometry) (VG9000 manufactured by VG Elemental). It was found out that the intensity of afterglow at a wavelength of 550 nm increased with an increase in the content of Si.

Figure 3:
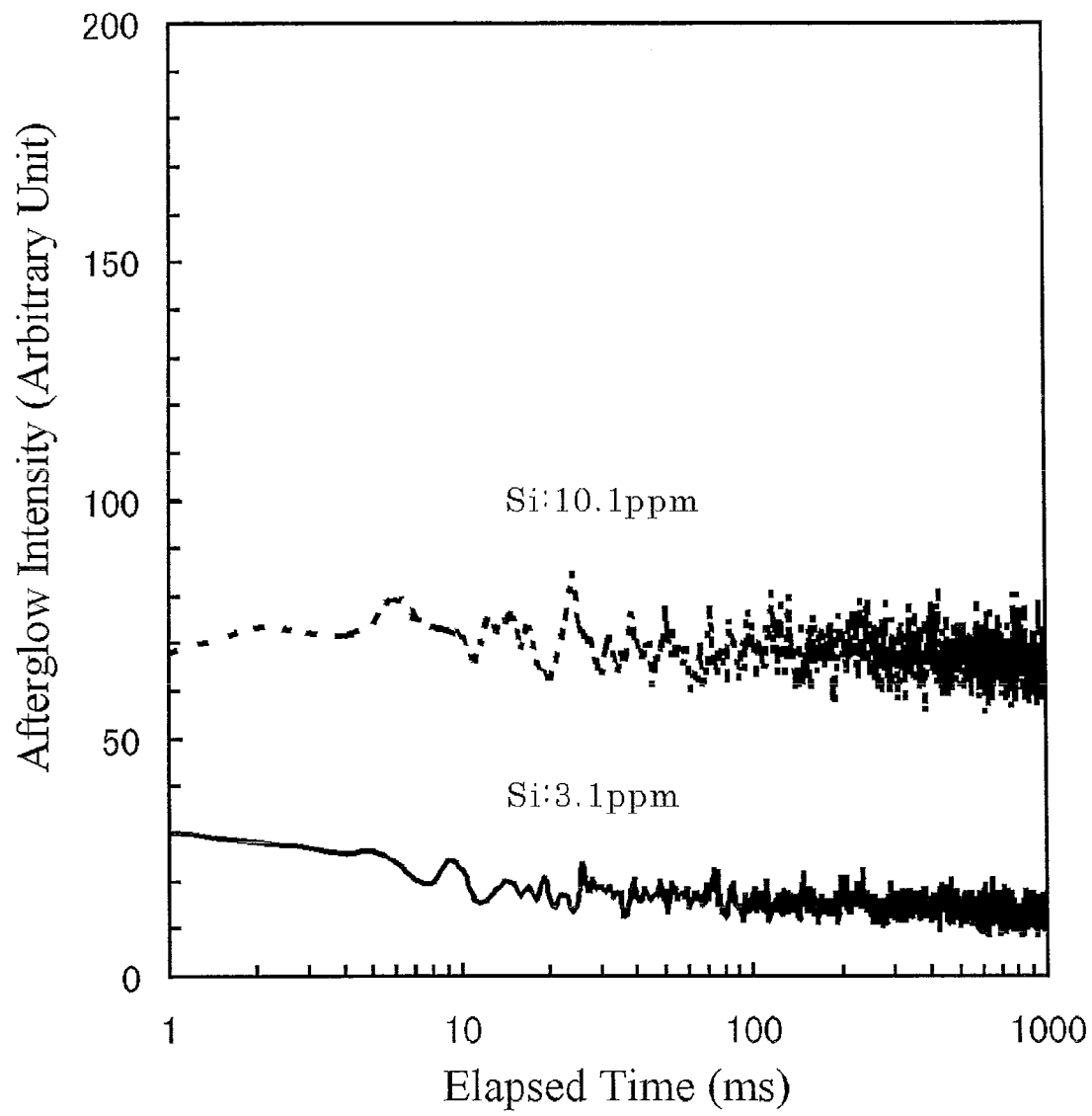
FIG. 3 is a schematic diagram of afterglow profiles at a wavelength of 550 nm of fluorescent materials having different contents of Si.

FIG. 3 is a diagram showing the results obtained by measuring an afterglow profile of each of a sample containing 10 mass ppm of Si and a sample containing 3 mass ppm of Si. The figure shows that the fluorescent component due to Si causes very long-lived fluorescence. Even 1000 ms after the termination of the X-ray radiation, the florescence still does not disappear.

No case has hitherto been reported in which $Si^{4+}$ ion acts as an fluorescent activator ion. A chemical formula of a garnet structure containing gadolinium (Gd), gallium (Ga), aluminum (Al), oxygen (O), and silicon (Si) is $(Gd, Ce)_3(Al, Ga)_5O_{12}$. A garnet crystal structure contains three sites: C site (dodecahedral site); A site (octahedral site), and D site (tetrahedral site). The C site contains almost all of the rare earth ions. The A site contains substantially the rest thereof. The A site and the D site each contain both Al and Ga. The C site substantially does not contain both Al and Ga. A $Si^{4+}$ ion (ionic radius: 0.26 angstroms) is thought to have substituted an $Al^{3+}$ ion (ionic radius: 0.39 angstroms) because both radii are similarly great. A trivalent $Ga^{3+}$ ion is easily negatively chargeable. Therefore, this substitution is thought to cause $Ga^{3+}$ in the D site to be negatively charged to become $Ga^+$, thereby maintaining the neutrality of the charge as a whole. A electron transition from 4 p to 4 s is known to cause $Ga^+$ to emit light. Therefore, $Ga^+$ is thought to be essential for the production of an afterglow.

Figure 4:
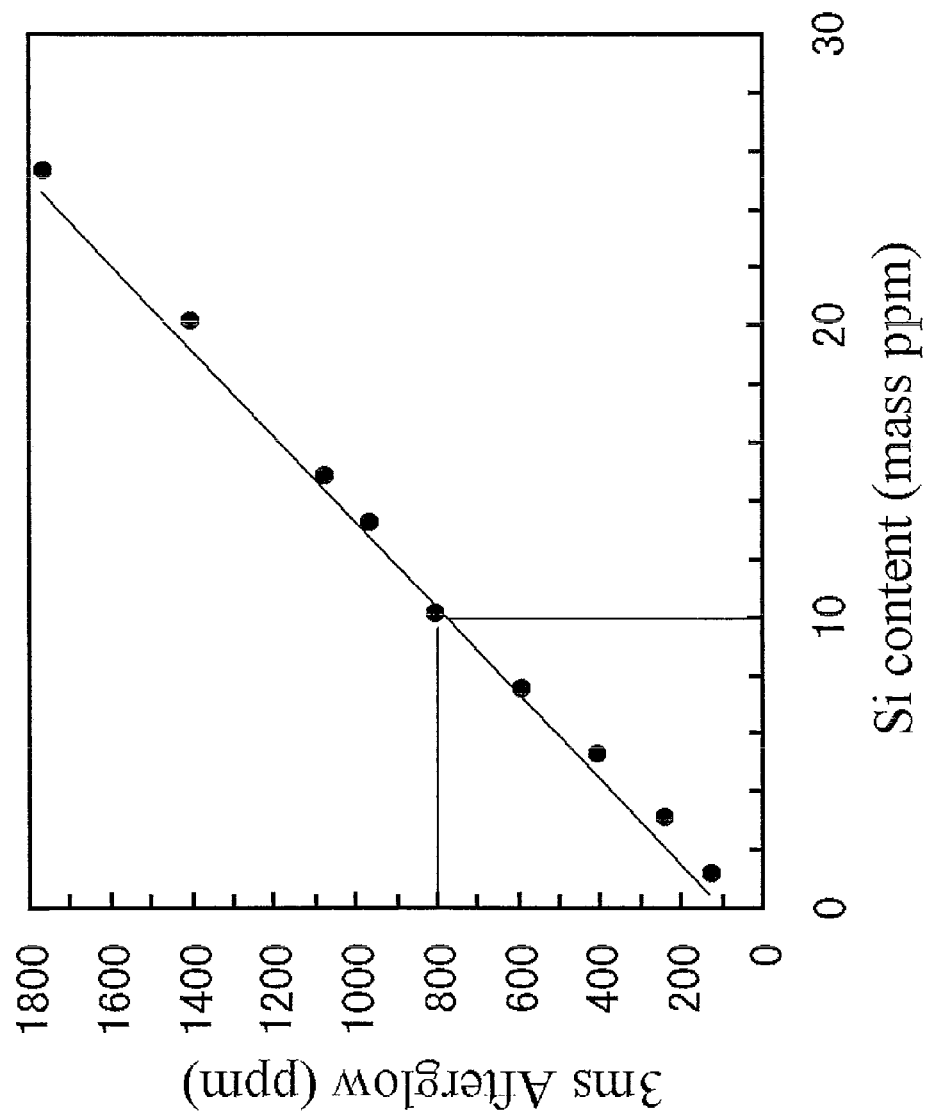
FIG. 4 is a schematic diagram of the relationship between the content of Si and the level of a 3 ms afterglow regarding a fluorescent material according to an embodiment of the present invention.

FIG. 4 is a diagram showing the relationship between the content of Si and a 3 ms afterglow. The content of Si is proportional to the 3 ms afterglow. It was found out that the 3 ms afterglow increased with an increase in the content of Si. All the above results led to the present invention. The present invention makes it possible, in particular, to control the level of afterglow in the above fluorescent material of GGAG:Ce. The present invention will be described below in detail based on the preferred embodiments with reference to the accompanying drawings.

First Embodiment

A fluorescent material according to the first embodiment of the present invention contains Ce as an fluorescent activator. In addition, the material contains at least Gd, Al, Ga, O and Si. The element M is at least one of Mg, Ti, and Ni. The composition of the material is expressed by the following general formula.

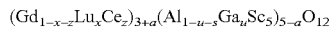

wherein
0≦a≦0.15,
0≦x≦0.5,
0.0003≦z≦0.0167,
0.2≦u≦0.6, and
0≦s≦0.1, and wherein,
0.5≦Si concentration (mass ppm)≦10, and
0≦M concentration (mass ppm)≦50.

Figure 5:
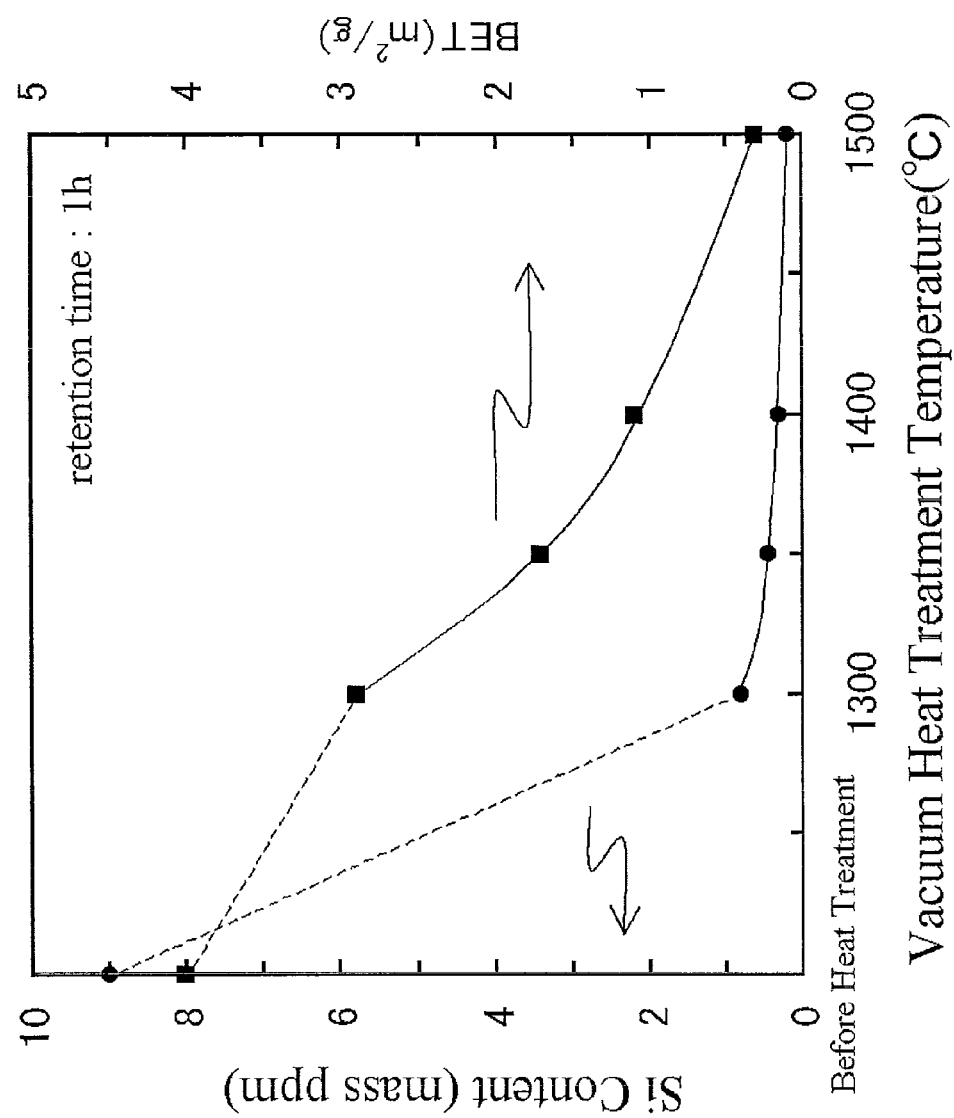
FIG. 5 is a schematic diagram of the relationships between temperatures at which an $Al_2O_3$ powder is heat treated, and the content of Si and the BET values.
Figure 6:
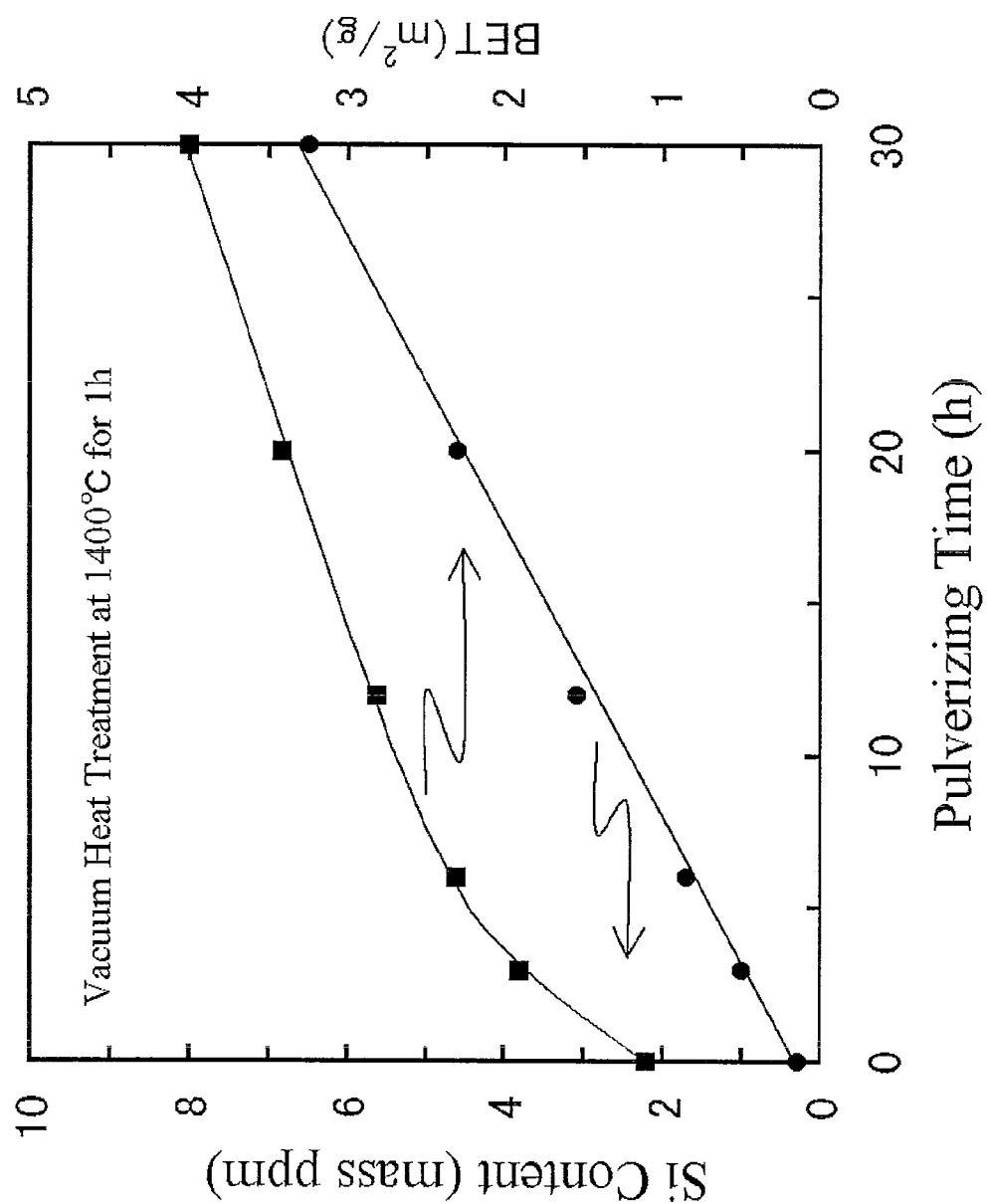
FIG. 6 is a schematic diagram of the relationships between pulverizing time for the $Al_2O_3$ powder heat treated at a temperature of 1400° C. under a vacuum, and the content of Si and the BET values.

This material according to the present invention must contain Si. The content of Si ranges from 0.5 to 10 mass ppm. FIG. 4 shows that when the content of Si exceeds 10 mass ppm, this causes the 3 ms afterglow to exceed 800 ppm. Therefore, the after glow exceeds the tolerance level. This causes the upper limit of the content of Si to be set at 10 mass ppm. However, the upper limit is preferably 5 mass ppm. In addition, first, the raw materials to be used to synthesize a fluorescent material each contain Si. In particular, the $Al_2O_3$ powder contains as much as ten to several tens of mass ppm of Si. Therefore, a fluorescent material synthesized by use of such raw materials inevitably contains Si. Second, when pulverizing a mixture of raw materials, or when pulverizing calcined power, a ball mill is used. The ball is made of $Al_2O_3$ because $Al_2O_3$ is also the main component of GGAG. However, a commercially available high-purity $Al_2O_3$ (purity of 99.9%) contains also Si. Thus, Si from the ball enters into the mixture. The content of Si in a raw material may be decreased by heat treating the raw material under a vacuum to remove Si. However, if the content of Si in a raw material is to be decreased to smaller than 0.5 mass ppm, a high temperature vacuum heat treatment is necessary. This causes grain growth in the raw material. This also agglomerates the raw material firmly. FIG. 5 is directed to the case in which $Al_2O_3$ power is heat treated under a vacuum. FIG. 5 shows the relationship between the temperature in the process thereof, the content of Si, and the BET value. The figure shows that the content of Si decreases with an increase in the temperature. However, the BET value also decreases at the same time, thereby causing grain growth. This is also shown in the figure. Therefore, if a homogenous sintered body is to be obtained, a raw material must be pulverized after the completion of the vacuum heat treatment. However, when performing the pulverizing process, this also causes Si to enter into the raw material, thereby causing an increase in the content of Si in the fluorescent material. FIG. 6 is directed to the case in which an $Al_2O_3$ powder after being heat treated at a temperature of 1400° C. under a vacuum, which is able to minimize the content of Si, is pulverized using a ball mill provided with an $Al_2O_3$ ball. FIG. 6 shows the relationship between the pulverizing time, the content of Si in the $Al_2O_3$ powder, and the BET value. The figure shows the BET value increases with an increase in the pulverizing time. However, the content of Si also increases at the same time. This is also shown. If abnormal grain growth is to be avoided in order to obtain a homogenous sintered body, the BET value of a raw material should be not smaller than 2 $m^2/g$. This makes it necessary, from practical reasons, to set the lower limit at 0.5 mass ppm. As described above, the BET value is set at a value that is not smaller than 2 $m^2/g$. Similarly, as described above, the upper limit of the content of Si is set at 10 mass ppm. Under these conditions, the temperature of the vacuum heat treatment preferably ranges from 1300 to 1400° C. Similarly, under these conditions, the pulverizing time preferably ranges from 3 to 30 h.

As described above, for a fluorescent material according to the present invention, it is essential that the D site thereof contain Si. Regarding $Ga^{3+}$ contained in a garnet crystal structure containing Gd, Al, Ga, and O, Si changes $Ga^{3+}$ to $Ga^+$ to thereby cause long-lived fluorescence. Therefore, the content of Si is critical for a short-time afterglow at 1 to 10 ms as well as for a long-time afterglow at 10 to 300 ms. A raw material such as $Gd_2O_3$, $Al_2O_3$, and $Ga_2O_3$ contains Si. In particular, $Al_2O_3$ contains as much as ten to several tens of mass ppm of Si. The content of Si in a raw material may be controlled by heat treating the raw material under a vacuum. The content of Si may be decreased by increasing the temperature of the heat treatment or the duration thereof. However, such an increase tends to agglomerate the raw material firmly. This makes a pulverizing process necessary. However, such a pulverizing process inevitably causes Si from the $Al_2O_3$ ball to enter into the material, thereby causing an increase in the content of Si in the fluorescent material. The content of Si has 0.5 mass ppm as a lower limit. The level of a 3 ms afterglow increases with an increase in the content of Si. If the content of Si is not greater than 10 mass ppm, the level of a 3 ms afterglow may be limited to a value that is not greater than 800 ppm. This is preferable for a scintillator to be used in a high-speed X-ray CT (Computed Tomography) scanner. More preferably, the content of Si is not greater than 5 ppm.

One cause of the production of an afterglow is that, in addition to the type of energy level formed by $Ce^{3+}$ that, by the nature thereof, is able to emit light, a different type of energy level permitting an electron transition is formed in a forbidden band. Thus, an electron transition via the latter type of a level may occur. This causes an afterglow. When a hole is produced in a C site (dodecahedral site), this causes the latter type of an energy level to be formed. However, this may be suppressed by setting $0 \leq a$. This in turn produces high fluorescence intensity and decreases the level of afterglow. On the other hand, when the value a increases, this facilitates formation of $GdAlO_3$, etc., constituting a perovskite phase (heterogeneous phase). This phase is distinct from a garnet structure. The index of refraction of a perovskite phase differs from that of a garnet phase constituted by the matrix. Light is thereby scattered in the perovskite phase. This decreases light transmittance for light having a fluorescence wavelength. This in turn decreases the fluorescence intensity of this fluorescent material.

Figure 7:
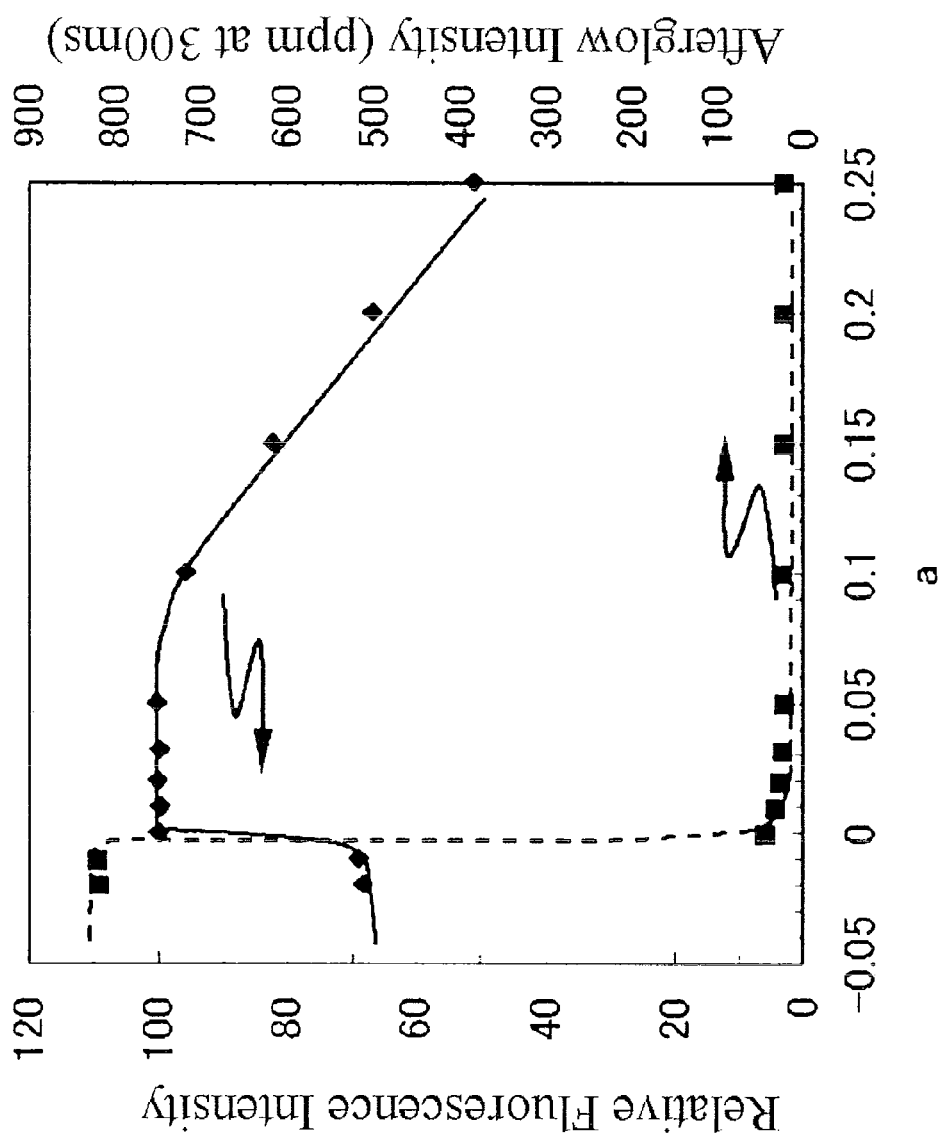
FIG. 7 is a schematic diagram of the relationships between the value a, and the relative fluorescence intensity and the level of a 300 ms afterglow regarding a fluorescent material according to an embodiment of the present invention.

FIG. 7 is directed to the case in which x=0.1, z=0.0026, and u=0.41. FIG. 7 is a diagram showing the dependence of the fluorescence intensity and of the 300 ms afterglow on the value a. In this case, the relative fluorescence intensity is the fluorescence intensity when the maximum is defined as 100%. The maximum is the intensity when a=0. A "w" ms afterglow is the fluorescence intensity "w" milliseconds after the termination of X-ray radiation. The "w" is, for example, 3, 10, 30, or 300. The afterglow intensity of a "w" ms afterglow expresses the ratio of the fluorescence intensity during the emission of X-rays to the fluorescence intensity "w" milliseconds after the termination of X-ray radiation. The unit thereof is ppm (parts per million). When a=0, the fluorescence intensity is high. However, the level of afterglow is also high. When a>0, due to the above reason, the level of afterglow decreases rapidly. On the other hand, the fluorescence intensity decreases gradually with an increase in the value a. Thus, when a=0.15, the relative fluorescence intensity is 80% of the intensity when a=0. When the value a exceeds 0.15, this generate a perovskite phase. The relative fluorescence intensity decreases thereby further. Therefore, when the lower limit of the relative fluorescnce intensity is set at 80%, the upper limit of the value a must be set at 0.15 in order to obtain a fluorescent material having a low level of afterglow and a high fluorescence intensity. When the value a exceeds 0.15, this causes the relative fluorescence intensity to become smaller than 80%, though the level of afterglow is low. In order to obtain particularly high fluorescence intensity and a low intensity of afterglow, the value a is preferably set at 0.005 to 0.05. This follows from FIG. 7.

Figure 8:
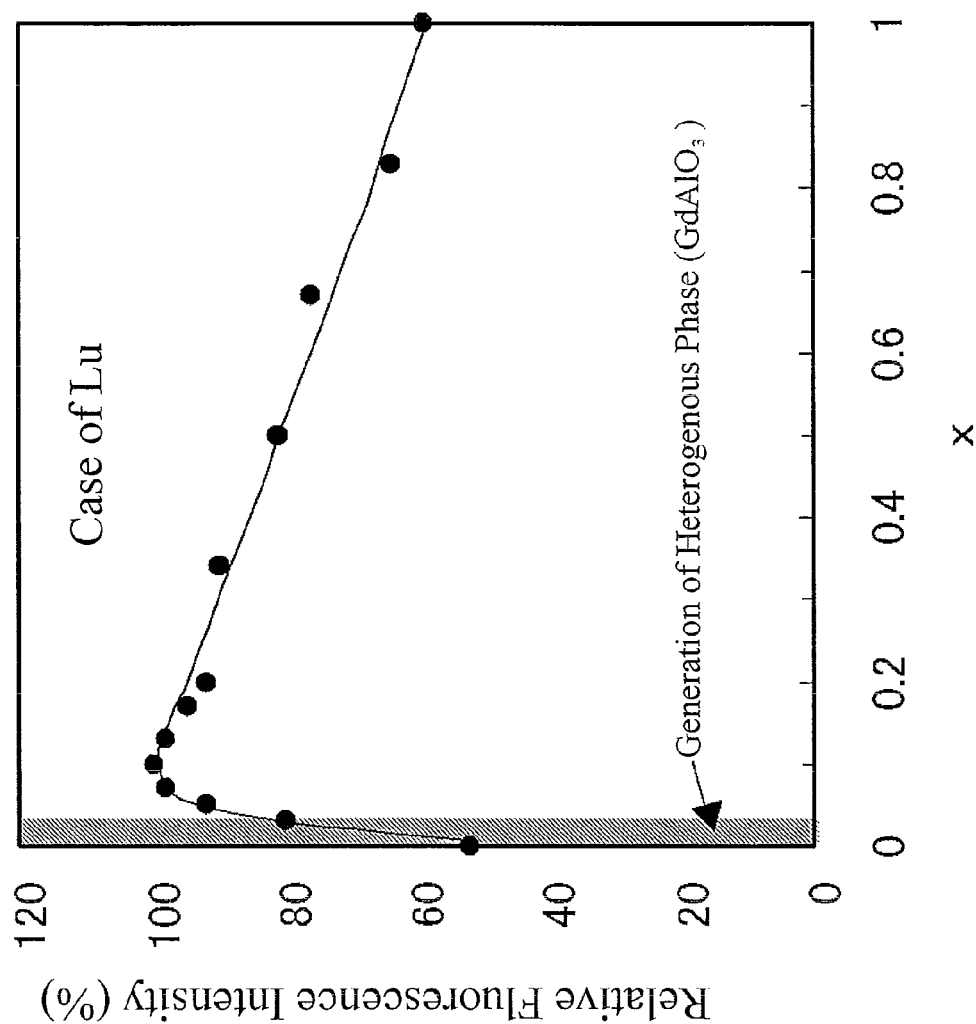
FIG. 8 is a schematic diagram of the relationships between the value x and the relative fluorescence intensity regarding a fluorescent material according to an embodiment of the present invention.

If the C site (dodecahedral site) includes Lu, this decreases the average ionic radius of the C site (dodecahedral site). This in turn decreases the lattice constant small. This enables Al having a small ionic radius to reside stably in the A site (octahedral site). This suppresses the precipitation of a heterogeneous phase. The atom Lu has a large atomic weight. This increases the density of this fluorescent material. In addition, this increases the absorption coefficient of X-rays. FIG. 8 is directed to the case in which a=0.10, z=0.0026, and u=0.41. FIG. 8 is a diagram showing the dependence of a relative fluorescence intensity on the value x. In this case, the relative fluorescence intensity is the fluorescence intensity when the maximum is defined as 100%. The maximum is the fluorescence intensity when x=0.10. FIG. 8 shows that the fluorescence intensity decreases with an increase in the value x. In this process, increasing the value x means substituting Lu for Gd. When substituting Lu for Gd, this decreases the lattice constant. This results in an increase in the width of the forbidden band. This shifts the fluorescence wavelength toward the side having shorter wavelengths. In general, a photodetector in a X-ray computed tomography is implemented by a silicon photodiode. A silicon photodiode has high spectral sensitivity on the side having longer wavelengths up to 800 to 900 run. Therefore, when the amount of Lu substitutions increases, this decreases the fluorescence intensity in a region in which a silicon photodiode has high sensitivity. Therefore, if the lower limit of the relative fluorescence intensity is set at 80%, then $x \leq 0.5$ is set. On the other hand, if x is smaller than 0.03, this generates $GdAlO_3$ constituting a heterogeneous phase. This is shown in the hatched region shown in FIG. 8. Therefore, in order to obtain particularly high fluorescence intensity, and at the same time, in order to avoid generation of a heterogeneous phase, x is preferably 0.03 to 0.2 in view of FIG. 8.

Figure 9:
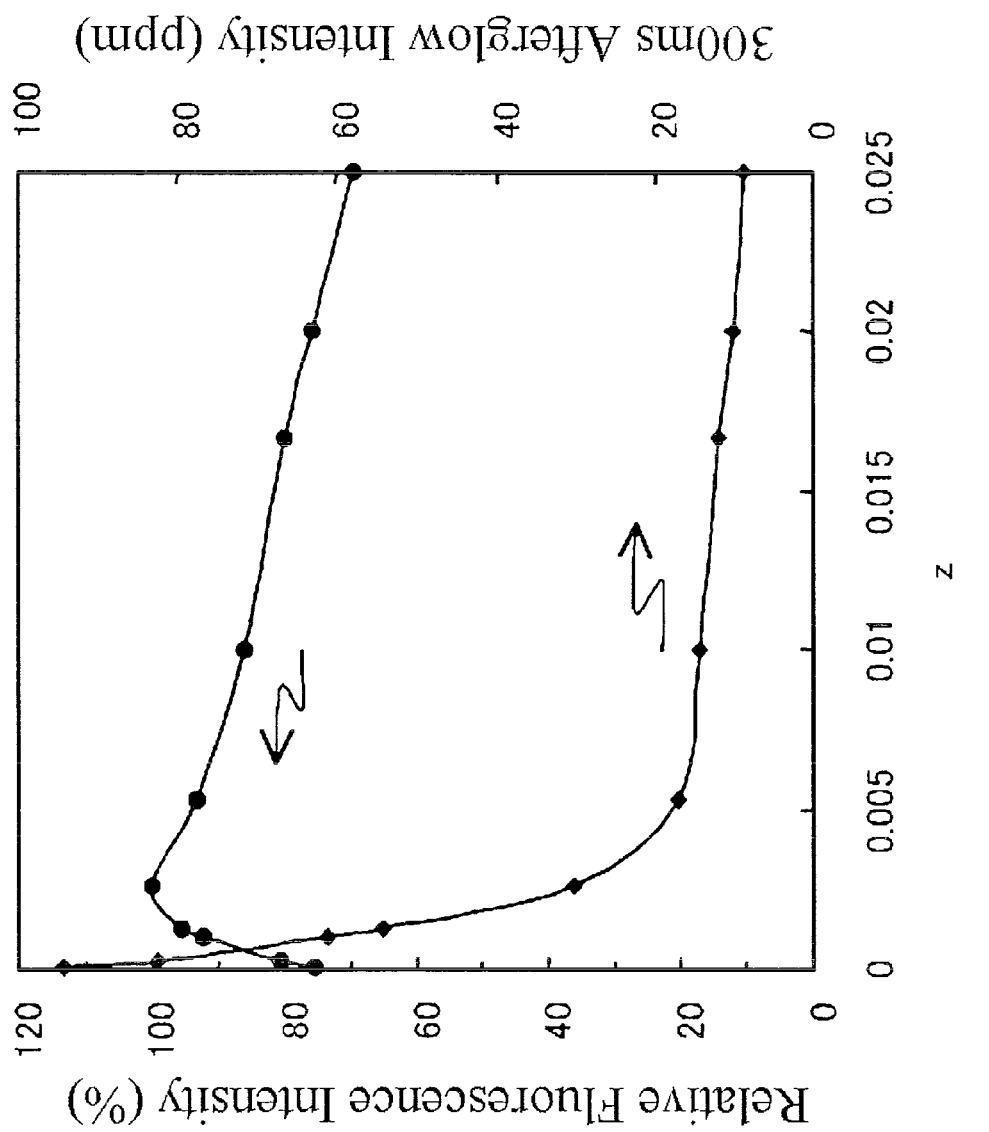
FIG. 9 is a schematic diagram of the relationships between the value z, and the relative fluorescence intensity and the level of a 300 ms afterglow regarding a fluorescent material according to an embodiment of the present invention.

The value z determines the composition of Ce. The element Ce is an fluorescent activator. As shown in FIG. 9, when $0.0003 \leq z \leq 0.0167$, this causes the fluorescence intensity to become particularly high. In this case, the relative fluorescence intensity is the fluorescence intensity when the maximum is defined as 100%. The maximum is the fluorescence intensity when z=0.003. When z is smaller than 0.003, the number of Ce atoms to act as fluorescent activators, is too small. This inhibit absorbed X-ray energy from being efficiently converted into light energy. When z is greater than 0.0167, this causes the Ce—Ce interatomic distance to become too small. This generates energy migration (so-called concentration quenching). This results in an decrease in fluorescence intensity. In order to obtain particularly high fluorescence intensity, the value z preferably ranges from 0.001 to 0.005. This can be seen from FIG. 9.

Figure 10:
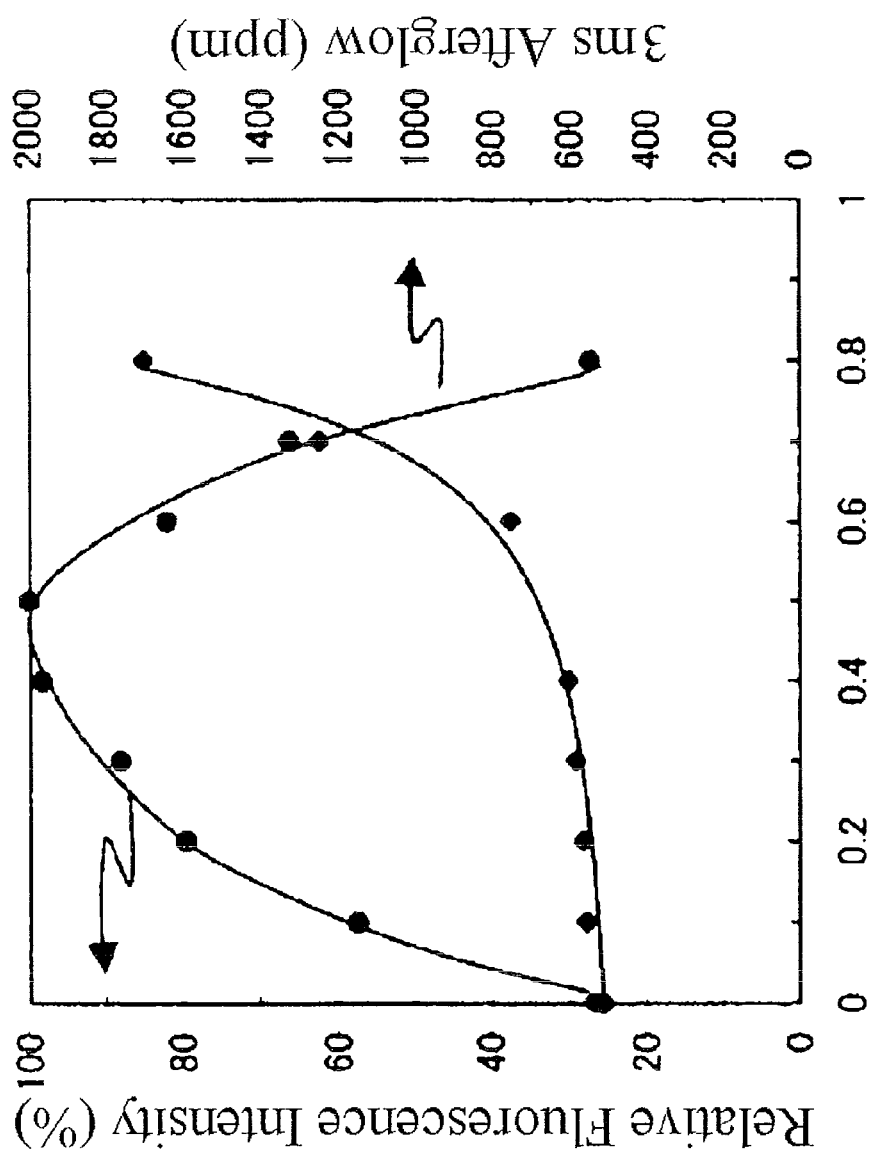
FIG. 10 is a schematic diagram of the relationships between the value u, and the relative fluorescence intensity and the level of a 3 ms afterglow regarding a fluorescent material according to an embodiment of the present invention.

The value u determines the compositional ratio between Al and Ga. As shown in FIG. 10, when $0.2 \leq u \leq 0.6$, this increases the fluorescence intensity. In this case, the relative fluorescence intensity is the fluorescence intensity when the maximum (the fluorescence intensity when u=0.5 in this case) is defined as 100%. In particular, the fluorescence intensity peaks at u=0.4. When the value u is smaller than 0.2, this generates a perovskite phase. As described above, this phase decreases the fluorescence intensity. When the value u is greater than 0.6, this decreases the fluorescence intensity. This increases the level of afterglow. In order to obtain particularly high relative fluorescence intensity (not smaller than 95%), the value u preferably ranges from 0.35 to 0.55. This can be seen from FIG. 10.

The element Sc occupies the entirety of the A site (octahedral site). This is an additive element acting to increase the fluorescence intensity and to decrease the level of afterglow. Generally, Ga ion has charge of +3. However, the ion with charge of +3 is easily to become monovalent. When Ga ion is charged with +1 (the ionic radius of $Ga^{+1}$ is greater than that of $Ga^{+3}$), this Ga ion has effective charge of −2. This decreases the fluorescence intensity and increases the level of afterglow. The ionic radius of $Sc^{3+}$ is greater than the ionic radius of $Al^{3+}$ and the ionic radius of $Ga^{3+}$. Therefore, Sc is thought to occupy the entirety of the A site so as to suppress change in the valence of $Ga^{3+}$.

Figure 11:
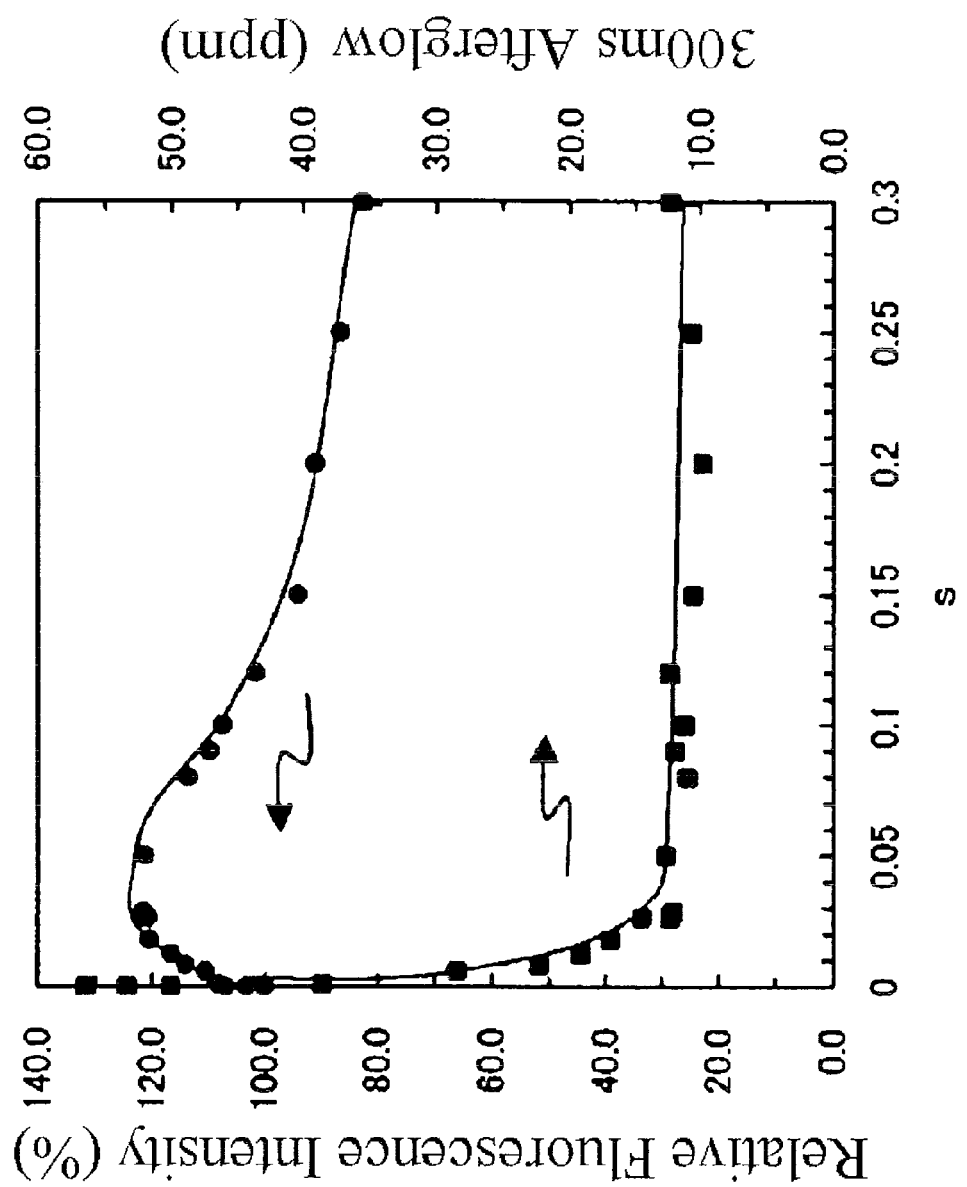
FIG. 11 is a schematic diagram of the relationships between the value s, and the relative fluorescence intensity and the level of a 300 ms afterglow regarding a fluorescent material according to an embodiment of the present invention.

FIG. 11 is directed to the case in which a=0.12, x=0.096, z=0.0026, u=0.41. FIG. 11 is a diagram showing the dependence of the relative fluorescence intensity and the level of a 300 ms afterglow on the value s (Sc composition). In this case, the relative fluorescence intensity is the light intensity when s=0 is defined as 100%. Addition of a trace of Sc considerably decreases the level of afterglow. The level of afterglow does not change when the value s is not smaller than 0.03. On the other hand, the fluorescence intensity peaks at s=0.05. When the value s further increases, this decreases the fluorescence intensity. Therefore, s≦0.1 is set. In order to obtain high fluorescence intensity and a low level of afterglow, the value s preferably ranges from 0.01 to 0.1. This can be seen from the plotted curves of points shown in FIG. 11.

As an element M acting to decrease the level of afterglow, Mg, Ni, Ti are effective. Mg and Ni each are divalent. Ti is tetravalent. The optimal content of M is 0 to 50 mass ppm. However, the fluorescence intensity decreases with an increase in the content of M. Therefore, the content of M preferably ranges from 3 to 15 mass ppm.

Figure 12:
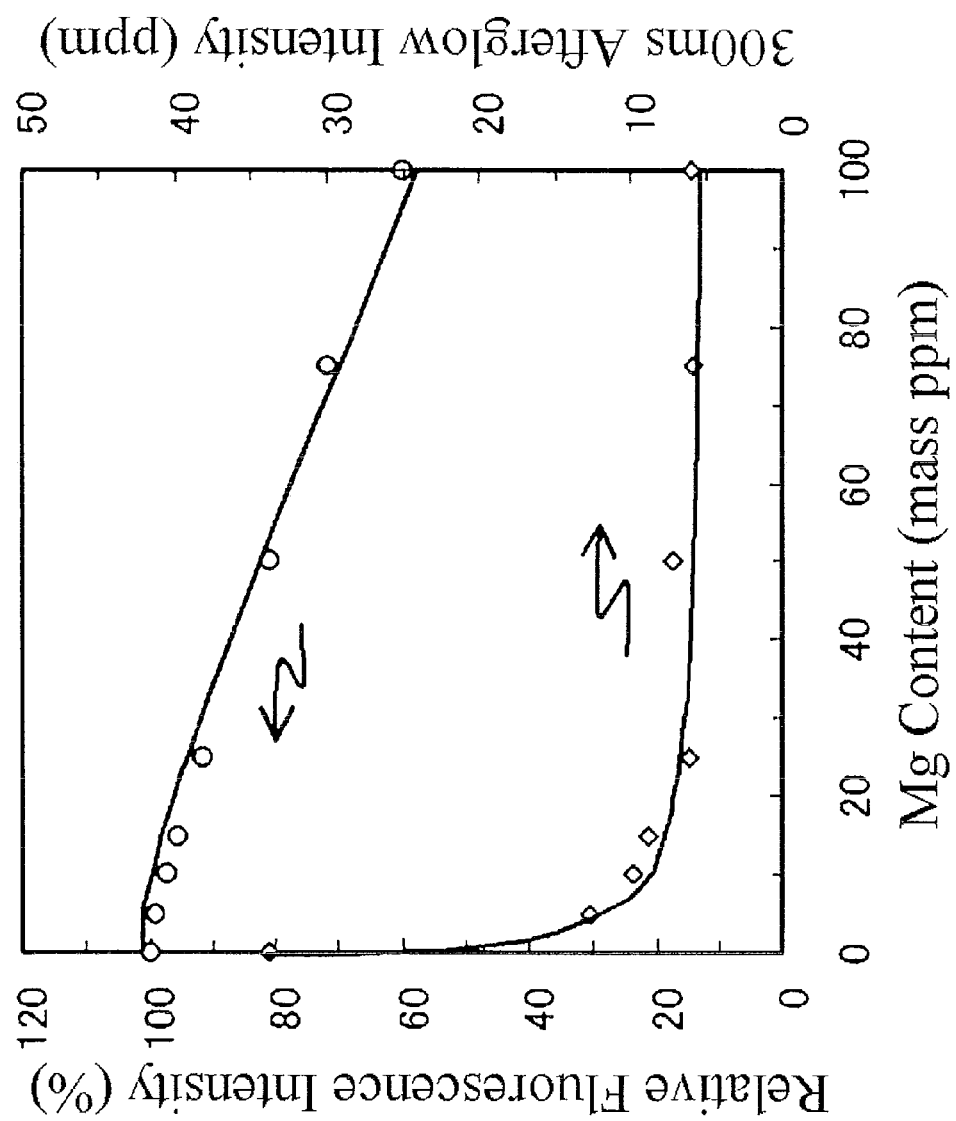
FIG. 12 is a schematic diagram of the relationships between the content of Mg, and the relative fluorescence intensity and the level of a 300 ms afterglow regarding a fluorescent material according to an embodiment of the present invention.
Figure 13:
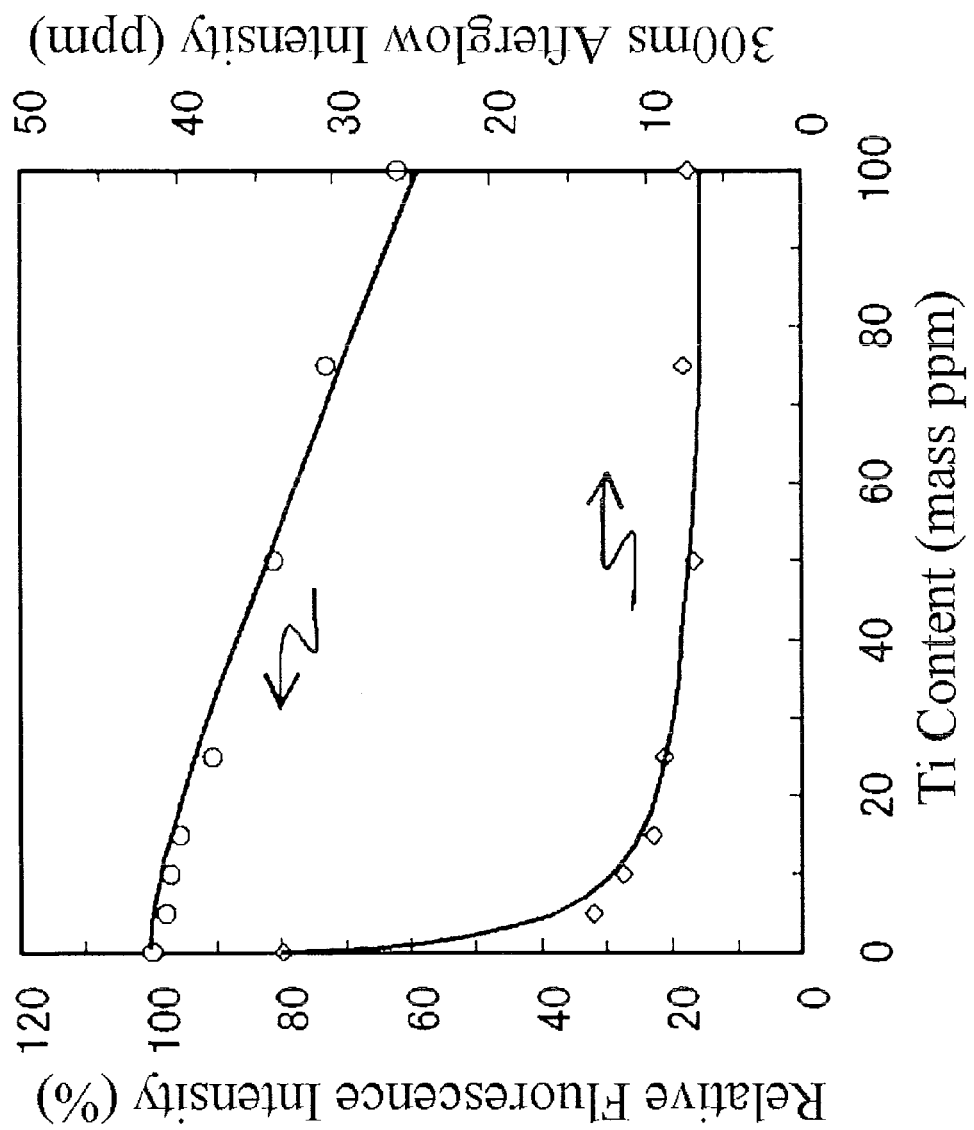
FIG. 13 is a schematic diagram of the relationships between the content of Ti, and the relative fluorescence intensity and the level of a 300 ms afterglow regarding a fluorescent material according to an embodiment of the present invention.
Figure 14:
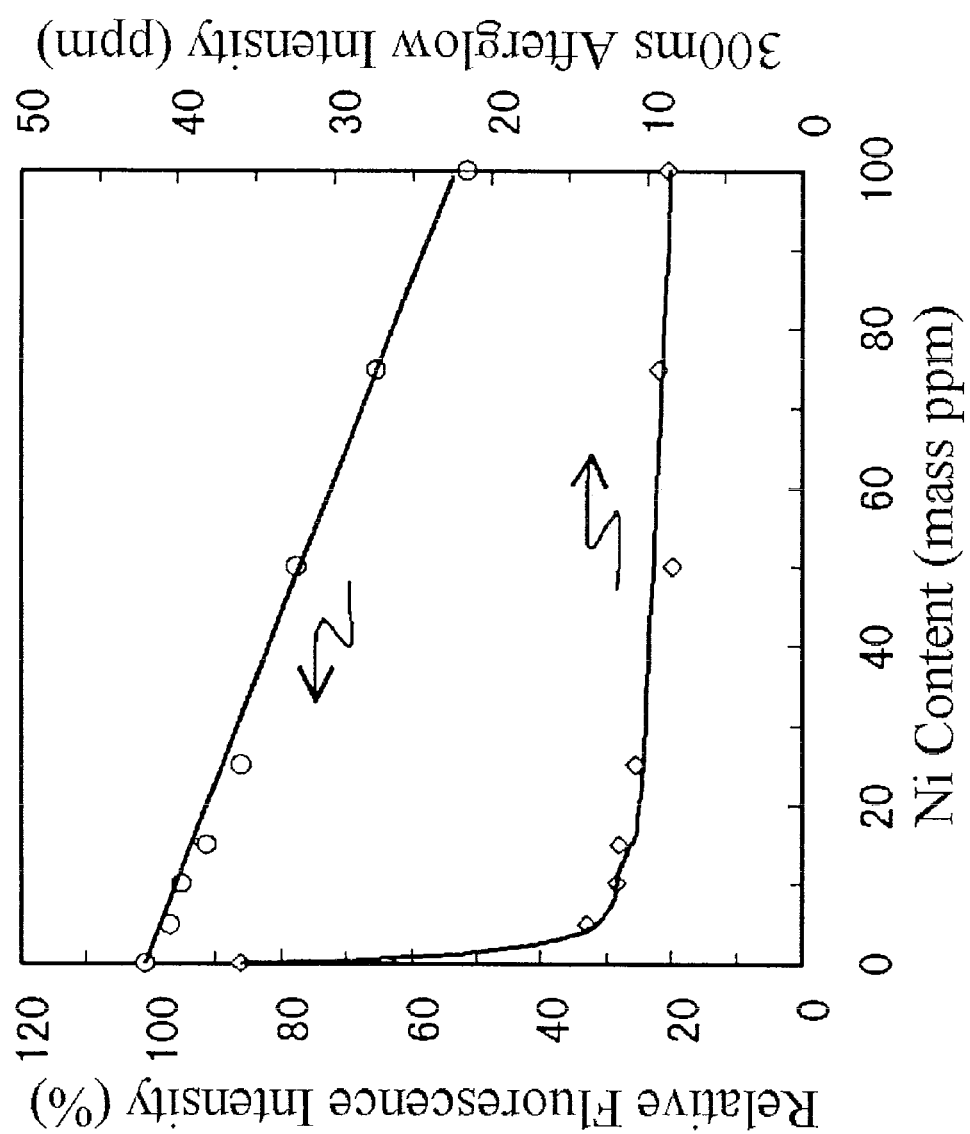
FIG. 14 is a schematic diagram of the relationships between the content of Ni, and the relative fluorescence intensity and the level of a 300 ms afterglow regarding a fluorescent material according to an embodiment of the present invention.

FIGS. 12 to 14 are directed to M=Mg, M=Ti, and M=Ni, respectively. FIGS. 12 to 14 directed to the case in which a=0.03, x=0.1, z=0.0026, and u=0.41, s=0.01. The each figures are a diagram showing the dependence of the relative fluorescence intensity and of a 300 ms afterglow on the content of M. In this case, the relative fluorescence intensity is the fluorescence intensity when M=0 is defined as 100%. Addition of a trace of M considerably decreases the level of afterglow. On the other hand, the relative fluorescence intensity rapidly decreases with increasing M. In order to obtain high fluorescence intensity, M should be not greater than 50 mass ppm. More preferably, M is not greater than 15 mass ppm. In order to obtain a low level of afterglow, the lower limit of M should be set at 3 mass ppm. All this can bee seen from FIGS. 12 to 14.

As described above, the composition of a fluorescent material having a garnet structure is expressed by a formula of $(Gd_{1-x-z}Lu_xCe_z)_{3+a}(Al_{1-u-s}Ga_uSc_s)_{5-a}O_{12}$. Instead of this formula, the composition of the material may be expressed by the content (mass percent) of each element. Then, the above set of preferable ranges (0≦a≦0.15, 0≦x≦0.5, 0.0003≦z≦0.0167, 0.2≦u≦0.6, 0≦s≦0.1, 0.5≦Si concentration (mass ppm)≦10, and 0≦M concentration (mass ppm) ≦50) corresponds to the following:

24.3≦Gd concentration (mass %)≦57.6
0≦Lu concentration (mass %)≦31.1
0.02≦Ce concentration (mass %)≦0.7
4.0≦Al concentration (mass %)≦12.8
7.5≦Ga concentration (mass %)≦22.6
0≦Sc concentration (mass %)≦2.64
19.6≦O concentration (mass %)≦22.8
0.5≦Si concentration (mass ppm)≦10
0≦M concentration (mass ppm)≦50

The element M is at least one of Mg, Ti, and Ni. The sum of these elements is set at 100 mass %.

In the above composition, the above set of more preferable ranges (0.005≦a≦0.05, 0.003≦x≦0.2, 0.001≦z≦0.005, 0.35≦u≦0.55, 0.01≦s≦0.1, 0.5≦Si concentration (mass ppm)≦5, and 3≦M concentration (mass ppm)≦15) corresponds to the following:

45.9≦Gd concentration (mass %)≦52.8
1.7≦Lu concentration (mass %)≦12.0
0.06≦Ce concentration (mass %)≦0.24
7.0≦Al concentration (mass %)≦10.0
13.7≦Ga concentration (mass %)≦20.6
0.05≦Sc concentration (mass %)≦0.5
20.7≦O concentration (mass %)≦21.9
0.5≦Si concentration (mass ppm)≦5
3≦M concentration (mass ppm)≦15

The above fluorescent material may be polycrystalline. A polycrystal is formed by sintering the mixture powder made of the raw materials at a temperature lower than the melting point thereof. Alternatively, a polycrystal is formed, first, by calcining the mixture powder of raw materials, then by pulverizing the resultant product, and finally by sintering the resultant product at a temperature lower than the melting point thereof. If a polycrystal and a single crystal have the same structure, the light transmittance of the former is lower than that of the latter. Therefore, a polycrystal is inferior to a single crystal in performance, in particular, in fluorescence intensity. However, a polycrystal synthesizes rapidly as opposed to a single crystal. This makes it possible to efficiently manufacture a polycrystal. This in turn makes a fluorescent material easily obtainable at low cost. If this type of a fluorescent is used as a scintillator, this makes it possible to obtain inexpensively a radiation detector having superior mass product.

Second Embodiment

The second embodiment will be described below.

The above fluorescent material is used as a scintillator. The second embodiment relates to a radiation detector having this scintillator and a light receiving element. This element is designed to detect fluorescent light emitted from the scintillator. This radiation detector is preferably mounted in a medical observation device or a medical inspection device such as an X-ray CT (Computed Tomography) scanner, a PET (Positron Emission Tomography) scanner, or a PET/CT scanner.

The reason for the above is as follows.

If the above fluorescent material is used as a scintillator, this makes the fluorescence intensity high. In addition, this makes the decay time constant small. In addition, this makes the level of afterglow low. This makes it possible to obtain a high-performance radiation detector having high time resolution.

Figure 15:
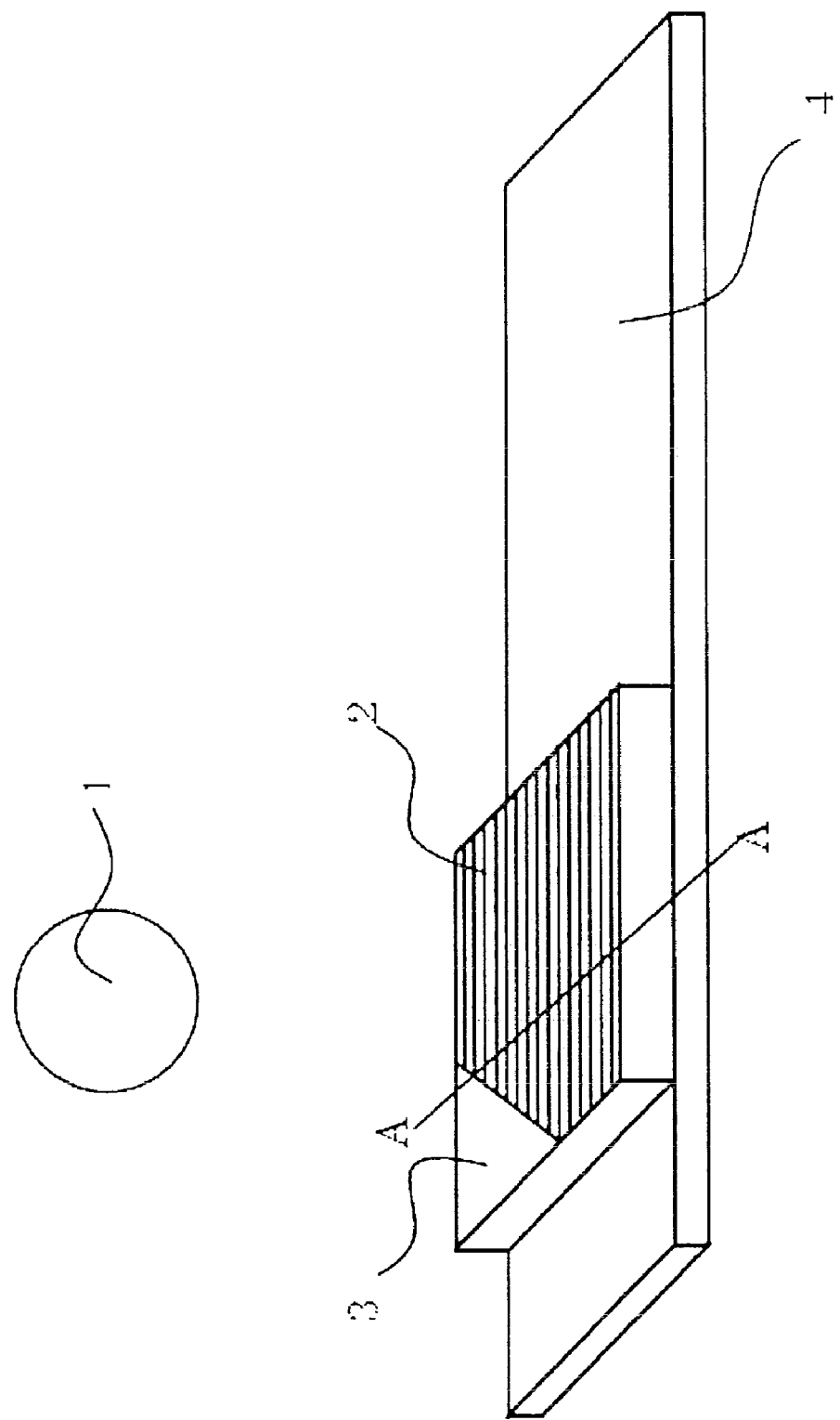
FIG. 15 is a perspective view of one example of a radiation detector according to the second embodiment of the present invention.
Figure 16:
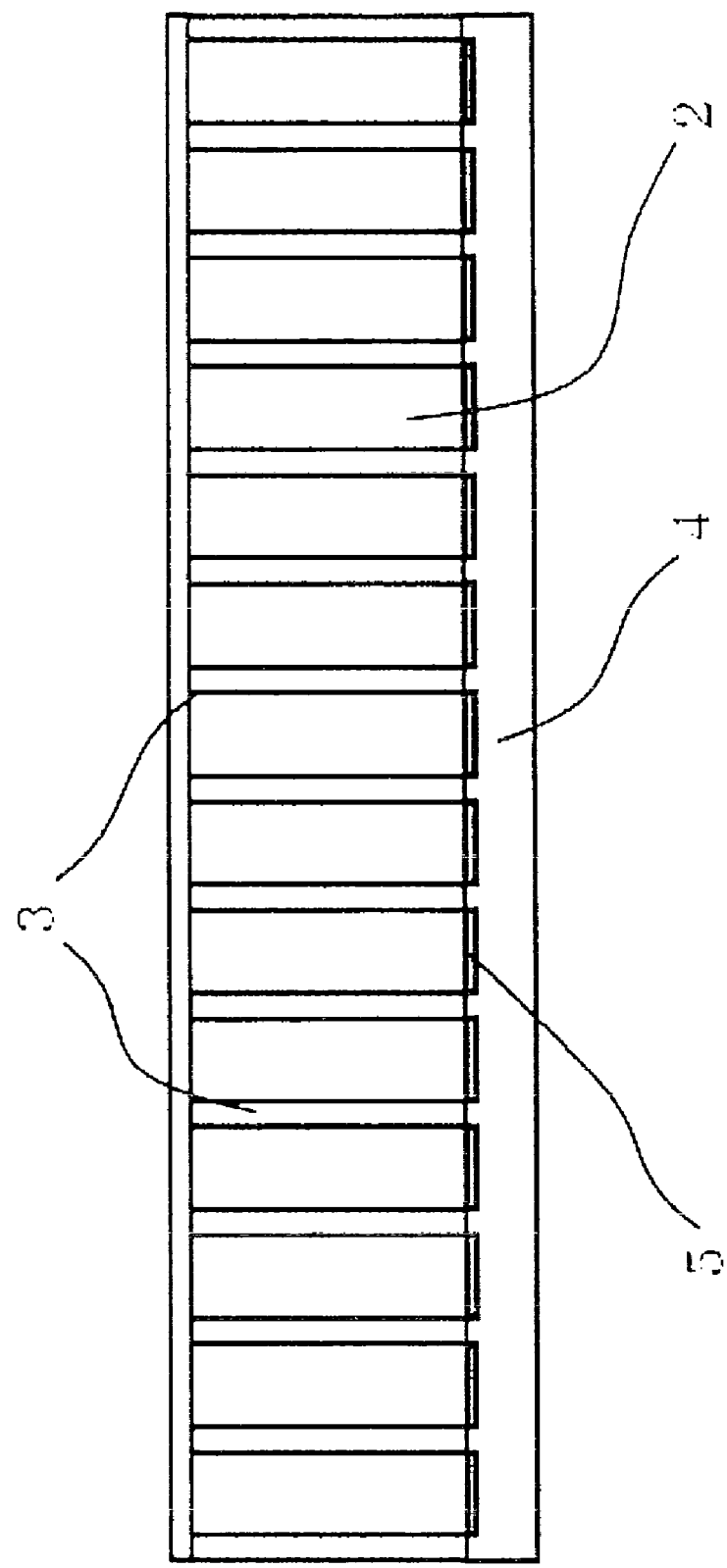
FIG. 16 is a cross-sectional view taken along line A-A in FIG. 15.

As shown in FIGS. 15 and 16, this radiation detector may be designed to include a scintillator and a photodetector. The detector serves to detect fluorescent light emitted from this fluorescent material. FIG. 15 is a schematic perspective view of a radiation detector. FIG. 16 is a sectional view taken along line A-A in FIG. 15. The radiation detector according to this embodiment is composed of 24 scintillators 2, a light reflection film 3, a 24 channel silicon photodiode array 5, and a wiring substrate 4. The 24 scintillators 2 are formed by slicing a scintillator block into 24 pieces. One piece corresponds to one scintillator 2. The scintillators 2 are arrayed with a pitch of 1.2 mm. The film 3 is formed by applying a mixture of titania and an epoxy resin onto the upper surface of each scintillator 2 and the side surface thereof and curing the resultant film. The diodes 5 are made to correspond to the scintillators 2 such that each diode 5 has a size of 1 mm×30 mm, and that the diodes 5 are arrayed with a pitch of 1.2 mm, that the light receiving surface of the light receiving portion of each diode 5 is positioned so as to precisely correspond to the light receiving surface of the corresponding scintillator 2, and that each diode 5 is fixed to the corresponding scintillator 2 via epoxy resin. The substrate 4 has the diodes 5 electrically connected thereto.

A silicon diode to be used as a photodetector is desirably a PIN type silicon photodiode. The reason is: First, the photodiode has high sensitivity and a fast response. Second, the photodiode is sensitive to the wavelengths ranging from visible light to near infrared light. All this contributes to the good matching between the photodiode and the fluorescent material.

A scintillator (fluorescent material) to be used in this radiation detector desirably has a thickness of 0.5 to 10 mm. A thickness smaller than 0.5 mm decreases fluorescence output and increases the level of leakage X-ray. On the other hand, a thickness greater than 5 mm decreases light transmittance, thereby decreasing fluorescence intensity. Therefore, either range of thickness is not preferable. In order to obtain a high-sensitivity radiation detector able to decrease the level of leakage X-ray and also able to produce a high fluorescence output, the thickness of such a scintillator is preferably 1.5 to 3 mm.

EXAMPLES

The present invention will be specifically described below based on preferred examples. These examples merely illustrate the invention. Thus, the fluorescent material according to the present invention is not limited thereto. Similarly, the radiation detector according to the present invention is not limited thereto.

A composition analysis was performed by an ICP-AES (Inductively Coupled Plasma Atomic Emission Spectrometry: OPTIMA-3300XL manufactured by Perkin Elmer). An analysis of Si is performed by a GDMS (Glow Discharge Mass Spectrometry)(VG9000 manufactured by VG Elemental). Table 1 shows analytical values of polycrystalline fluorescent materials in examples 1 to 15 of the first embodiment, and in comparative examples 1 to 8. Table 3 shows chemical formula obtained from the analytical values. If the content of M is smaller than several ppm, i.e., if there is only a trace of M, a GDMS is preferable applied.

Example 1

A resin pot having a volume of 1 liter was provided. An amount of 200 g of a raw material, 1300 g of a high-purity alumina ball having a diameter of 5 mm, and 200 cc of ethanol were placed into the pot. After mixing the contents for 12 h, change in the mass of the alumina ball is 0.06 g. In view of this, and considering that $Al_2O_3$ from the ball of a ball mill will enter into the mixture, 126.91 g of $Gd_2O_3$ (Si: 3 mass ppm), 0.363 g of $CeO_2$, 40.62 g of $Al_2O_3$ (Si: 10 mass ppm), and 32.05 g of $Ga_2O_3$ (Si: 10.0 mass ppm) were weighed. Regarding a powder made of a $Gd_2O_3$ raw material, a powder having an average particle size of 2 μm was used. The average particle size refers conventionally an average value. However, in this case, exceptionally, the average particle size means a median particle diameter. Regarding a powder made of an $Al_2O_3$, raw material, a powder having an average particle size of 0.6 μm was used. Regarding a powder made of a $Ga_2O_3$, raw material, a powder having an average particle size of 3 μm was used. Regarding the powder made of an $Al_2O_3$ raw material, first, the powder was heat treated at 1400° C. for 1 h under a vacuum of approximately 10 Pa. Subsequently, the powder was pulverized using a ball mill for 12 h. This decreased the content of Si from 10 mass ppm to 3 mass ppm. These powders made of the raw materials were milled and mixed by a wet ball mill under the above conditions. Subsequently, the resultant mixture powder was dried. Subsequently, 1 mass % of pure water was added to the powder. Subsequently, the powder was uniaxially press molded at a pressure of 500 kg/cm². Subsequently, the powder was isostatically cold pressed at a pressure of 3 tons/cm². A compact was thereby obtained that had a density of 54% of the theoretical density. Subsequently, the compact was put into an alimina pot. Subsequently, the pot was closed. Subsequently, the compact was primarily sintered at a temperature of 1675° C. for 3 h under a vacuum. A compact was thereby obtained that has a density of 99% of the theoretical density. Subsequently, the compact was isostatically hot pressed, i.e., sintered, at a temperature of 1500° C. for 3 h at a pressure of 1000 atm ($1.01 \times 10^5$ Pa) under an atmosphere of Ar. The resultant sintered compact had a denisty of 99.9% of the theoretical density. The sample thus obtained was machined to a plate having a width of 1 mm, a length of 30 mm, and a thickness of 2.5 mm. Subsequently, the sample was heat treated at a temperature of 1500° C. for 2 h under an atmosphere of 100% of oxygen by volume. Subsequently, the surface of the sample was optically polished so as to obtain a scintillator made of a polycrystalline fluorescent material. This scintillator was analyzed using a GDMS method. The content of Si was thereby determined to be 4.9 mass ppm. The analytical value of the content of Si in this synthesized scintillator is greater than the content of Si calculated from the content of Si in each of the raw materials and the ratio between these raw materials as components by approximately 0.5 mass ppm. This difference is due to entrance of Si from the alumina ball into the sample while the raw materials were being milled and mixed by a ball mill.

The fluorescent material obtained as described above was used as a scintillator so as to produce a radiation detector shown in FIGS. 15 and 16. This type of a radiation detector operates as follows: First, X-ray source 1 irradiates X-rays on a scintillator 2. This causes the scintillator 2 to be excited. The scintillator 2 emits thereby light. The light was detected by a 24 channel silicon photodiode array 5. The characteristics of the fluorescent material are thereby determined.

A signal amplifier was provided. The amplifier is designed to convert a current output signal from a silicon photodiode into a voltage signal. The amplifier is also designed to amplify the voltage signal. The amplifier was connected to the wiring substrate 4. This made it possible to obtain a signal amplifier designed to convert visible fluorescent light into an electric signal.

Example 2

The composition according to example 2 is shown in Table 2. The composition was obtained as follows: First, 122.19 g of $Gd_2O_3$ (Si: 1 mass ppm), 0.105 g of $CeO_2$, 30.77 g of $Al_2O_3$ (Si: 10 mass ppm), and 46.68 g of $Ga_2O_3$ (Si: 5 mass ppm) were weighed. Regarding a powder made of a $Gd_2O_3$ raw material, a powder having an average particle size of 2 μm was used. In this case, the average particle size refers to a median diameter. Regarding a powder made of an $Al_2O_3$, raw material, a powder having an average particle size of 0.6 μm was used. Regarding a powder made of a $Ga_2O_3$, raw material, a powder having an average particle size of 3 μm was used. Regarding the powder made of an $Al_2O_3$ material, first, the powder was heat treated at 1375° C. for 1 h under a vacuum of approximately 10 Pa. Subsequently, the material was pulverized using a ball mill for 3 h. This decreased the content of Si from 10 mass ppm to 1 mass ppm. Otherwise, the method similar to that in example 1 was applied to obtain a scintillator by use of a polycrystalline fluorescent material as a sample.

Example 3

The composition according to example 3 is shown in Table 2. The composition was obtained as follows: First, 115.96 g of $Gd_2O_3$ (Si: 5 mass ppm), 1.337 g of $CeO_2$, 21.95 g of $Al_2O_3$ (Si: 8 mass ppm), and 60.69 g of $Ga_2O_3$ (Si: 10 mass ppm) were weighed. Otherwise, the method similar to that in example 1 was applied to obtain a scintillator by use of a polycrystalline fluorescent material as a sample.

Example 4

The composition according to example 4 is shown in Table 2. The composition was obtained as follows: First, 119.25 g of $Gd_2O_3$ (Si: 1 mass ppm), 6.91 g of $Lu_2O_3$ (Si: 2 mass ppm), 0.359 g of $CeO_2$, 40.84 g of $Al_2O_3$ (Si: 10 mass ppm), and 32.38 g of $Ga_2O_3$ (Si: 10 mass ppm) were weighed. Subsequently, the $Al_2O_3$ raw material powder and the $Ga_2O_3$ raw material powder each were heat treated at 1375° C. for 1 h under a vacuum of approximately 10 Pa. Subsequently, each of the materials was pulverized using a ball mill for 3 h. This decreased the content of Si in each of the raw materials from 10 mass ppm to 1 mass ppm. The resultant $Al_2O_3$ powder and the resultant $Ga_2O_3$ powder were applied. Otherwise, the method similar to that in example 1 was applied to obtain a scintillator by use of a polycrystalline fluorescent material as a sample.

Example 5

The composition according to example 5 is shown in Table 2. The composition was obtained as follows: First, 83.90 g of $Gd_2O_3$ (Si: 3 mass ppm), 39.81 g of $Lu_2O_3$ (Si: 2 mass ppm), 0.689 g of $CeO_2$, 30.13 g of $Al_2O_3$ (Si: 10 mass ppm), and 45.41 g of $Ga_2O_3$ (Si: 10 mass ppm) were weighed. Regarding a powder made of a $Gd_2O_3$, raw material, a powder having an average particle size of 2 μm was used. Subsequently, the $Al_2O_3$ raw material powder was heat treated at 1400° C. for 1 h under a vacuum of approximately 10 Pa. Subsequently, the material was pulverized using a ball mill for 12 h. This decreased the content of Si in the raw material from 10 mass ppm to 3 mass ppm. The resultant $Al_2O_3$ powder was applied. Otherwise, the method similar to that in example 1 was applied to obtain a scintillator by use of a polycrystalline fluorescent material as a sample.

Example 6

The composition according to example 6 is shown in Table 2. The composition was obtained as follows: First, 60.07 g of $Gd_2O_3$ (Si: 7 mass ppm), 66.34 g of $Lu_2O_3$ (Si: 7 mass ppm), 0.338 g of $CeO_2$, 28.99 g of $Al_2O_3$ (Si: 10 mass ppm), 43.99 g of $Ga_2O_3$ (Si: 10 mass ppm) were weighed. Otherwise, the method similar to that in example 1 was applied to obtain a scintillator by use of a polycrystalline fluorescent material as a sample.

Example 7

The composition according to example 7 is shown in Table 2. The composition was obtained as follows: First, 113.86 g of $Gd_2O_3$ (Si: 0.3 mass ppm), 6.64 g of $Lu_2O_3$ (Si: 0.5 mass ppm), 1.034 g of $CeO_2$, 26.18 g of $Al_2O_3$ (Si: 10 mass ppm), 46.18 g of $Ga_2O_3$ (Si: 10 mass ppm), and 6.04 g of $Sc_2O_3$ (Si: 0.4 mass ppm) were weighed. Subsequently, the $Al_2O_3$ raw material powder and the $Ga_2O_3$ raw material powder each were heat treated at 1375° C. for 1 h under a vacuum of approximately 10 Pa. Subsequently, each of the materials was pulverized using a ball mill for 3 h. This decreased the content of Si in each of the raw materials from 10 mass ppm to 1 mass ppm. The resultant $Al_2O_3$ powder and the resultant $Ga_2O_3$ powder were applied. Otherwise, the method similar to that in example 1 was applied to obtain a scintillator by use of a polycrystalline fluorescent material as a sample.

Example 8

The composition according to example 8 is shown in Table 2. The composition was obtained as follows: First, 114.55 g of $Gd_2O_3$ (Si: 7 mass ppm), 6.66 g of $Lu_2O_3$ (Si: 2 mass ppm), 0.691 g of $CeO_2$, 27.73 g of $Al_2O_3$ (Si: 10 mass ppm), 46.32 g of $Ga_2O_3$ (Si: 10 mass ppm), and 3.79 g of $Sc_2O_3$ (Si: 0.4 mass ppm) were weighed. Otherwise, the method similar to that in example 1 was applied to obtain a scintillator by use of a polycrystalline fluorescent material as a sample.

Example 9

The composition according to example 9 is shown in Table 2. The composition was obtained as follows: First, 115.34 g of $Gd_2O_3$ (Si: 5 mass ppm), 6.68 g of $Lu_2O_3$ (Si: 2 mass ppm), 0.347 g of $CeO_2$, 30.17 g of $Al_2O_3$ (Si: 8 mass ppm), 46.49 g of $Ga_2O_3$ (Si: 10 mass ppm), and 0.912 g of $Sc_2O_3$ (Si: 0.4 mass ppm) were weighed. Otherwise, the method similar to that in example 1 was applied to obtain a scintillator by use of a polycrystalline fluorescent material as a sample.

Example 10

The composition according to example 10 is shown in Table 2. The composition was obtained as follows: First, 115.34 g of $Gd_2O_3$ (Si: 3 mass ppm), 6.68 g of $Lu_2O_3$ (Si: 2 mass ppm), 0.347 g of $CeO_2$, 29.97 g of $Al_2O_3$ (Si: 10 mass ppm), 46.49 g of $Ga_2O_3$ (Si: 10 mass ppm), 0.912 g of $Sc_2O_3$ (Si: 0.4 mass ppm), and 0.003 g of $Mg(NO_3)_2.6H_2O$ were weighed. Subsequently, the $Al_2O_3$ raw material powder was heat treated at 1400° C. for 1 h under a vacuum of approximately 10 Pa. Subsequently, the material was pulverized using a ball mill for 12 h. This decreased the content of Si in the raw material from 10 mass ppm to 3 mass ppm. The resultant $Al_2O_3$ powder was applied. Otherwise, the method similar to that in example 1 was applied to obtain a scintillator by use of a polycrystalline fluorescent material as a sample.

Example 11

The composition according to example 11 is shown in Table 2. The composition was obtained as follows: First, 115.34 g of $Gd_2O_3$ (Si: 5 mass ppm), 6.68 g of $Lu_2O_3$ (Si: 2 mass ppm), 0.347 g of $CeO_2$, 30.17 g of $Al_2O_3$ (Si: 8 mass ppm), 46.49 g of $Ga_2O_3$ (Si: 10 mass ppm), 0.912 g of $Sc_2O_3$ (Si: 0.4 mass ppm), and 0.027 g of $Mg(NO3)_2.6H_2O$ were weighed. Otherwise, the method similar to that in example 1 was applied to obtain a scintillator by use of a polycrystalline fluorescent material as a sample.

Example 12

The composition according to example 12 is shown in Table 2. The composition was obtained as follows: First, 115.34 g of $Gd_2O_3$ (Si: 3 mass ppm), 6.68 g of $Lu_2O_3$ (Si: 2 mass ppm), 0.347 g of $CeO_2$, 29.97 g of $Al_2O_3$ (Si: 10 mass ppm), 46.49 g of $Ga_2O_3$ (Si: 10 mass ppm), 0.912 g of $Sc_2O_3$ (Si: 0.4 mass ppm), and 0.003 g of $(C_4H_9O)_4Ti$ were weighed. Subsequently, the $Al_2O_3$ raw material powder was heat treated at 1400° C. for 1 h under a vacuum of approximately 10 Pa. Subsequently, the material was pulverized using a ball mill for 12 h. This decreased the content of Si in the raw material from 10 mass ppm to 3 mass ppm. The resultant $Al_2O_3$ powder was applied. Otherwise, the method similar to that in example 1 was applied to obtain a scintillator by use of a polycrystalline fluorescent material as a sample.

Example 13

The composition according to example 13 is shown in Table 2. The composition was obtained as follows: First, 115.34 g of $Gd_2O_3$ (Si: 3 mass ppm), 6.68 g of $Lu_2O_3$ (Si: 2 mass ppm), 0.347 g of $CeO_2$, 30.17 g of $Al_2O_3$ (Si: 10 mass ppm), 46.49 g of $Ga_2O_3$ (Si: 10 mass ppm), 0.912 g of $Sc_2O_3$ (Si: 0.4 mass ppm), and 0.036 g of $(C_4H_9O)_4Ti$ were weighed. Subsequently, the $Al_2O_3$ raw material powder was heat treated at 1400° C. for 1 h under a vacuum of approximately 10 Pa. Subsequently, the material was pulverized using a ball mill for 12 h. This decreased the content of Si in the raw material from 10 mass ppm to 3 mass ppm. The resultant $Al_2O_3$ powder was applied. Otherwise, the method similar to that in example 1 was applied to obtain a scintillator by use of a polycrystalline fluorescent material as a sample.

Example 14

The composition according to example 14 is shown in Table 2. The composition was obtained as follows: First, 115.34 g of $Gd_2O_3$ (Si: 7 mass ppm), 6.68 g of $Lu_2O_3$ (Si: 2 mass ppm), 0.347 g of $CeO_2$, 29.97 g of $Al_2O_3$ (Si: 10 mass ppm), 46.49 g of $Ga_2O_3$ (Si: 10 mass ppm), 0.912 g of $Sc_2O_3$ (Si: 0.4 mass ppm), and 0.003 g of $Ni(NO_3)_2.6H_2O$ were weighed. Otherwise, the method similar to that in example 1 was applied to obtain a scintillator by use of a polycrystalline fluorescent material as a sample.

Example 15

The composition according to example 15 is shown in Table 2. The composition was obtained as follows: First, 115.34 g of $Gd_2O_3$ (Si: 7 mass ppm), 6.68 g of $Lu_2O_3$ (Si: 2 mass ppm), 0.347 g of $CeO_2$, 30.17 g of $Al_2O_3$ (Si: 10 mass ppm), 46.49 g of $Ga_2O_3$ (Si: 10 mass ppm), 0.912 g of $Sc_2O_3$ (Si: 0.4 mass ppm), and 0.029 g of $Ni(NO_3)_2.6H_2O$ were weighed. Otherwise, the method similar to that in example 1 was applied to obtain a scintillator by use of a polycrystalline fluorescent material as a sample.

Example 16

The composition according to example 16 is shown in Table 2. The composition was obtained as follows: First, 116.66 g of $Gd_2O_3$ (Si: 0.3 mass ppm), 4.38 g of $Lu_2O_3$ (Si: 0.5 mass ppm), 0.310 g of $CeO_2$, 26.57 g of $Al_2O_3$ (Si: 10 mass ppm), 44.39 g of $Ga_2O_3$ (Si: 10 mass ppm), and 7.63 g of $Sc_2O_3$ (Si: 0.4 mass ppm) were weighed. Subsequently, the $Al_2O_3$ raw material powder and the $Ga_2O_3$ raw material powder each were heat treated at 1375° C. for 1 h under a vacuum of approximately 10 Pa. Subsequently, each of the materials was pulverized using a ball mill for 3 h. This decreased the content of Si in each of the raw materials from 10 mass ppm to 1 mass ppm. The resultant $Al_2O_3$ powder and the resultant $Ga_2O_3$ powder were applied. Otherwise, the method similar to that in example 1 was applied to obtain a scintillator by use of a polycrystalline fluorescent material as a sample.

Example 17

The composition according to example 17 is shown in Table 2. The composition was obtained as follows: First, 121.17 g of $Gd_2O_3$ (Si: 0.3 mass ppm), 4.41 g of $Lu_2O_3$ (Si: 0.5 mass ppm), 0.322 g of $CeO_2$, 30.38 g of $Al_2O_3$ (Si: 10 mass ppm), 42.77 g of $Ga_2O_3$ (Si: 10 mass ppm), and 0.88 g of $Sc_2O_3$ (Si: 0.4 mass ppm) were weighed. Subsequently, the $Al_2O_3$ raw material powder and the $Ga_2O_3$ raw material powder each were heat treated at 1375° C. for 1 h under a vacuum of approximately 10 Pa. Subsequently, each of the materials was pulverized using a ball mill for 3 h. This decreased the content of Si in each of the raw materials from 10 mass ppm to 1 mass ppm. The resultant $Al_2O_3$ powder and the resultant $Ga_2O_3$ powder were applied. Otherwise, the method similar to that in example 1 was applied to obtain a scintillator by use of a polycrystalline fluorescent material as a sample.

Example 18

The composition according to example 18 is shown in Table 2. The composition was obtained as follows: First, 117.98 g of $Gd_2O_3$ (Si: 0.3 mass ppm), 4.42 g of $Lu_2O_3$ (Si: 0.5 mass ppm), 0.035 g of $CeO_2$, 31.81 g of $Al_2O_3$ (Si: 10 mass ppm), 44.78 g of $Ga_2O_3$ (Si: 10 mass ppm), and 0.92 g of $Sc_2O_3$ (Si: 0.4 mass ppm) were weighed. Subsequently, the $Al_2O_3$ raw material powder and the $Ga_2O_3$ raw material powder each were heat treated at 1375° C. for 1 h under a vacuum of approximately 10 Pa. Subsequently, each of the materials was pulverized using a ball mill for 3 h. This decreased the content of Si in each of the raw materials from 10 mass ppm to 1 mass ppm. The resultant $Al_2O_3$ powder and the resultant $Ga_2O_3$ powder were applied. Otherwise, the method similar to that in example 1 was applied to obtain a scintillator by use of a polycrystalline fluorescent material as a sample.

Example 19

The composition according to example 19 is shown in Table 2. The composition was obtained as follows: First, 116.03 g of $Gd_2O_3$ (Si: 0.3 mass ppm), 4.42 g of $Lu_2O_3$ (Si: 0.5 mass ppm), 1.936 g of $CeO_2$, 31.82 g of $Al_2O_3$ (Si: 10 mass ppm), 44.80 g of $Ga_2O_3$ (Si: 10 mass ppm), and 0.92 g of $Sc_2O_3$ (Si: 0.4 mass ppm) were weighed. Subsequently, the $Al_2O_3$ raw material powder and the $Ga_2O_3$ raw material powder each were heat treated at 1375° C. for 1 h under a vacuum of approximately 10 Pa. Subsequently, each of the materials was pulverized using a bail mill for 3 h. This decreased the content of Si in each of the raw materials from 10 mass ppm to 1 mass ppm. The resultant $Al_2O_3$ powder and the resultant $Ga_2O_3$ powder were applied. Otherwise, the method similar to that in example 1 was applied to obtain a scintillator by use of a polycrystalline fluorescent material as a sample.

Example 20

The composition according to example 20 is shown in Table 2. The composition was obtained as follows: First, 124.46 g of $Gd_2O_3$ (Si: 0.3 mass ppm), 4.68 g of $Lu_2O_3$ (Si: 0.5 mass ppm), 0.331 g of $CeO_2$, 47.37 g of $Al_2O_3$ (Si: 10 mass ppm), 22.13 g of $Ga_2O_3$ (Si: 10 mass ppm), and 0.98 g of $Sc_2O_3$ (Si: 0.4 mass ppm) were weighed. Subsequently, the $Al_2O_3$ raw material powder and the $Ga_2O_3$ raw material powder each were heat treated at 1375° C. for 1 h under a vacuum of approximately 10 Pa. Subsequently, each of the materials was pulverized using a ball mill for 3 h. This decreased the content of Si in each of the raw materials from 10 mass ppm to 1 mass ppm. The resultant $Al_2O_3$ powder and the resultant $Ga_2O_3$ powder were applied. Otherwise, the method similar to that in example 1 was applied to obtain a scintillator by use of a polycrystalline fluorescent material as a sample.

Comparative Example 1

The composition according to comparative example 1 is shown in Table 2. The composition was obtained as follows: First, 118.61 g of $Gd_2O_3$ (Si: 7 mass ppm), 6.87 g of $Lu_2O_3$ (Si: 2 mass ppm), 0.357 g of $CeO_2$, 28.82 g of $Al_2O_3$ (Si: 21 mass ppm), 44.41 g of $Ga_2O_3$ (Si: 18 mass ppm), and 0.871 g of $Sc_2O_3$ (Si: 0.4 mass ppm) were weighed. Otherwise, the method similar to that in example 1 was applied to obtain a scintillator by use of a polycrystalline fluorescent material as a sample.

Comparative Example 2

The composition according to comparative example 2 is shown in Table 2. The composition was obtained as follows: First, 113.33 g of $Gd_2O_3$ (Si: 7 mass ppm), 6.69 g of $Lu_2O_3$ (Si: 2 mass ppm), 2.314 g of $CeO_2$, 29.99 g of $Al_2O_3$ (Si: 21 mass ppm), 46.51 g of $Ga_2O_3$ (Si: 18 mass ppm), and 0.913 g of $Sc_2O_3$ (Si: 0.4 mass ppm) were weighed. These raw materials were milled and mixed by a wet ball mill. The mill was provided with a high-purity alumina ball of 5 mm diameter. Subsequently, the resultant mixture powder was dried. Subsequently, the powder was placed in an alumina pot of a B5 size. The powder was thereby calcined at 1400° C. for 2 h. Subsequently, the powder was cooled. Subsequently, the powder was sufficiently loosened. The resultant calcined powder was pulverized by a wet ball mill for 10 h under the above conditions. Subsequently, the powder was dried. The resultant powder of a fluorescent material had an average size of 1.5 μm. Subsequently, a method similar to that in example 1 was applied to obtain a scintillator made of a polycrystalline material.

Comparative Example 3

The composition according to comparative example 3 is shown in Table 2. The composition was obtained as follows: First, 108.93 g of $Gd_2O_3$ (Si: 7 mass ppm), 6.31 g of $Lu_2O_3$ (Si: 2 mass ppm), 0.328 g of $CeO_2$, 15.22 g of $Al_2O_3$ (Si: 21 mass ppm), 68.29 g of $Ga_2O_3$ (Si: 18 mass ppm), and 0.861 g of $Sc_2O_3$ (Si: 0.4 mass ppm) were weighed. Subsequently, a method similar to that in comparative example 2 was applied to obtain a scintillator made of a polycrystalline material.

Comparative Example 4

The composition according to comparative example 4 is shown in Table 2. The composition was obtained as follows: First, 114.01 g of $Gd_2O_3$ (Si: 7 mass ppm), 6.61 g of $Lu_2O_3$ (Si: 5 mass ppm), 0.343 g of $CeO_2$, 23.07 g of $Al_2O_3$ (Si: 21 mass ppm), 45.95 g of $Ga_2O_3$ (Si: 18 mass ppm), and 9.766 g of $Sc_2O_3$ (Si: 0.4 mass ppm) were weighed. Subsequently, a method similar to that in example 1 was applied to obtain a scintillator made of a polycrystalline material.

Comparative Example 5

The composition according to comparative example 5 is shown in Table 2. The composition was obtained as follows: First, 115.34 g of $Gd_2O_3$ (Si: 7 mass ppm), 6.68 g of $Lu_2O_3$ (Si: 2 mass ppm), 0.347 g of $CeO_2$, 30.17 g of $Al_2O_3$ (Si: 21 mass ppm), 46.49 g of $Ga_2O_3$ (Si: 18 mass ppm), and 0.912 g of $Sc_2O_3$ (Si: 0.4 mass ppm) were weighed. Subsequently, a method similar to that in comparative example 2 was applied to obtain a scintillator made of a polycrystalline material.

Comparative Example 6

The composition according to comparative example 6 is shown in Table 2. The composition was obtained as follows: First, 115.34 g of $Gd_2O_3$ (Si: 5 mass ppm), 6.68 g of $Lu_2O_3$ (Si: 2 mass ppm), 0.347 g of $CeO_2$, 29.97 g of $Al_2O_3$ (Si: 8 mass ppm), 46.49 g of $Ga_2O_3$ (Si: 10 mass ppm), 0.912 g of $Sc_2O_3$ (Si: 0.4 mass ppm), and 0.141 g of $Mg(NO_3)_2 \cdot 6H_2O$ were weighed. Otherwise, a method similar to that in example 1 was applied to obtain a scintillator made of a polycrystalline material.

Comparative example 7

The composition according to comparative example 7 is shown in Table 2. The composition was obtained as follows: First, 115.34 g of $Gd_2O_3$ (Si: 3 mass ppm), 6.68 g of $Lu_2O_3$ (Si: 2 mass ppm), 0.347 g of $CeO_2$, 30.17 g of $Al_2O_3$ (Si: 10 mass ppm), 46.49 g of $Ga_2O_3$ (Si: 10 mass ppm), 0.912 g of $Sc_2O_3$ (Si: 0.4 mass ppm), and 0.185 g of $(C_4H_9O)_4Ti$ were weighed. Regarding the $Al_2O_3$ raw powder, first, the powder was heat treated at 1400° C. for 1 h under a vacuum of approximately 10 Pa. Subsequently, the powder was pulverized using a ball mill for 12 h. This decreased the content of Si from 10 mass ppm to 3 mass ppm. Otherwise, a method similar to that in example 1 was applied to obtain a scintillator made of a polycrystalline material.

Comparative Example 8

The composition according to comparative example 8 is shown in Table 2. The composition was obtained as follows: First, 115.34 g of $Gd_2O_3$ (Si: 7 mass ppm), 6.68 g of $Lu_2O_3$ (Si: 2 mass ppm), 0.347 g of $CeO_2$, 29.97 g of $Al_2O_3$ (Si: 10 mass ppm), 46.49 g of $Ga_2O_3$ (Si: 10 mass ppm), 0.912 g of $Sc_2O_3$ (Si: 0.4 mass ppm), and 0.158 g of $Ni(NO_3)_2 \cdot 6H_2O$ were weighed. Otherwise, a method similar to that in example 1 was applied to obtain a scintillator made of a polycrystalline material.

Regarding samples in examples 1 to 20 and in comparative samples 1 to 8, the intensity of fluorescence caused by the emission of X-rays was measured. In addition, the level of afterglow 3 ms after the termination of X-ray radiation was measured. These measurements were evaluated as follows: First, a radiation detector indicated in example 1 was produced. Subsequently, a tungsten target X-ray tube was used as an X-ray source. Subsequently, the tube voltage was made 120 kV. In addition, the tube current was made 5 mA. Under these conditions, X-rays were emitted onto the scintillator of the radiation detector. The measurements were thereby evaluated. The relative intensity of fluorescence caused by the emission of X-rays and the level of afterglow 3 ms after the termination of X-ray radiation are indicated in Table 4. The relative fluorescence intensity is the fluorescence intensity when the fluorescence intensity of a GOS:Pr scintillator is defined as 100%.

In examples 1 to 20, the fluorescent intensity was not smaller than 80%. In addition, the level of afterglow 3 ms after the termination of the X-ray radiation was not greater than 800 ppm. In comparative examples 4 and 5, the fluorescent intensity was not smaller than 80%. However, the level of afterglow 3 ms after the termination of X-ray radiation was considerably greater than 800 ppm. In comparative examples 1 to 3 and 6 to 8, the fluorescent intensity is considerably smaller than 80%.

TABLE 2

| | Gd | Lu | Ce | Al | Ga | Sc | Si Content (mass ppm) | M Content (mass ppm) |
|---|---|---|---|---|---|---|---|---|
| Example 1 | 55.1 | 0.00 | 0.148 | 10.8 | 11.9 | — | 4.9 | — |
| Example 2 | 53.0 | 0.00 | 0.043 | 8.21 | 17.4 | — | 2.2 | — |
| Example 3 | 50.3 | 0.00 | 0.545 | 5.83 | 22.6 | — | 7.3 | — |
| Example 4 | 51.7 | 3.04 | 0.146 | 10.9 | 12.1 | — | 1.2 | — |
| Example 5 | 36.4 | 17.5 | 0.280 | 8.00 | 16.9 | — | 4.8 | — |
| Example 6 | 26.1 | 29.2 | 0.140 | 7.74 | 16.4 | — | 8.8 | — |
| Example 7 | 49.4 | 2.92 | 0.421 | 6.94 | 17.2 | 1.97 | 0.5 | — |
| Example 8 | 49.7 | 2.93 | 0.281 | 7.41 | 17.2 | 1.23 | 9.2 | — |
| Example 9 | 50.0 | 2.94 | 0.141 | 8.00 | 17.3 | 0.297 | 7.3 | — |
| Example 10 | 50.0 | 2.94 | 0.141 | 8.00 | 17.3 | 0.297 | 4.5 | 1.5 |
| Example 11 | 50.0 | 2.94 | 0.141 | 8.00 | 17.3 | 0.297 | 7.1 | 13 |
| Example 12 | 50.0 | 2.94 | 0.141 | 8.00 | 17.3 | 0.297 | 5.0 | 2.3 |
| Example 13 | 50.0 | 2.94 | 0.141 | 8.00 | 17.3 | 0.297 | 4.3 | 25 |
| Example 14 | 50.0 | 2.94 | 0.141 | 8.00 | 17.3 | 0.297 | 8.1 | 2.7 |
| Example 15 | 50.0 | 2.94 | 0.141 | 8.00 | 17.3 | 0.297 | 9.8 | 29 |
| Example 16 | 50.6 | 1.93 | 0.126 | 7.05 | 16.5 | 2.488 | 0.5 | — |
| Example 17 | 52.6 | 1.94 | 0.131 | 8.06 | 15.9 | 0.288 | 0.5 | — |
| Example 18 | 51.2 | 1.94 | 0.014 | 8.43 | 16.7 | 0.301 | 0.5 | — |
| Example 19 | 50.4 | 1.95 | 0.789 | 8.44 | 16.7 | 0.301 | 0.5 | — |
| Example 20 | 54.0 | 2.06 | 0.135 | 12.55 | 8.2 | 0.318 | 0.5 | — |
| Comparative Example 1 | 51.5 | 3.02 | 0.145 | 7.64 | 16.5 | 0.284 | 12.6 | — |
| Comparative Example 2 | 49.2 | 2.94 | 0.943 | 8.01 | 17.3 | 0.298 | 16.1 | — |
| Comparative Example 3 | 47.3 | 2.78 | 0.133 | 4.04 | 25.4 | 0.281 | 20.5 | — |
| Comparative Example 4 | 49.5 | 2.91 | 0.140 | 6.17 | 17.1 | 3.18 | 14.4 | — |
| Comparative Example 5 | 50.0 | 2.94 | 0.141 | 8.00 | 17.1 | 0.297 | 23.7 | — |
| Comparative Example 6 | 50.0 | 2.94 | 0.141 | 8.00 | 17.1 | 0.297 | 7.3 | 67 |
| Comparative Example 7 | 50.0 | 2.94 | 0.141 | 8.00 | 17.1 | 0.297 | 5.8 | 130 |
| Comparative Example 8 | 50.0 | 2.94 | 0.141 | 8.00 | 17.1 | 0.297 | 9.7 | 160 |

TABLE 3 composition $(Gd_{1-x-z}Lu_xCe_z)_{3+a}(Al_{1-u-s}Ga_uSc_s)_{5-a}O_{12}$

| | a | x | z | u | s | Si content (mass ppm) | Type of M | M content (mass ppm) |
|---|---|---|---|---|---|---|---|---|
| Example 1 | 0.05 | 0 | 0.003 | 0.30 | 0 | 4.9 | — | — |
| Example 2 | 0.03 | 0 | 0.0009 | 0.45 | 0 | 2.2 | — | — |
| Example 3 | 0 | 0 | 0.012 | 0.60 | 0 | 7.3 | — | — |
| Example 4 | 0.01 | 0.05 | 0.003 | 0.30 | 0 | 1.2 | — | — |
| Example 5 | 0.06 | 0.3 | 0.006 | 0.45 | 0 | 4.8 | — | — |
| Example 6 | 0.12 | 0.5 | 0.003 | 0.45 | 0 | 8.8 | — | — |
| Example 7 | 0.03 | 0.05 | 0.009 | 0.45 | 0.08 | 0.5 | — | — |
| Example 8 | 0.03 | 0.05 | 0.006 | 0.45 | 0.05 | 9.2 | — | — |
| Example 9 | 0.03 | 0.05 | 0.003 | 0.45 | 0.012 | 7.3 | — | — |
| Example 10 | 0.03 | 0.05 | 0.003 | 0.45 | 0.012 | 4.5 | Mg | 1.5 |
| Example 11 | 0.03 | 0.05 | 0.003 | 0.45 | 0.012 | 7.1 | Mg | 13 |
| Example 12 | 0.03 | 0.05 | 0.003 | 0.45 | 0.012 | 5.0 | Ti | 2.3 |
| Example 13 | 0.03 | 0.05 | 0.003 | 0.45 | 0.012 | 4.3 | Ti | 25 |
| Example 14 | 0.03 | 0.05 | 0.003 | 0.45 | 0.012 | 8.1 | Ni | 2.7 |
| Example 15 | 0.03 | 0.05 | 0.003 | 0.45 | 0.012 | 9.8 | Ni | 29 |
| Example 16 | 0.01 | 0.033 | 0.0027 | 0.428 | 0.1 | 0.5 | — | — |
| Example 17 | 0.15 | 0.032 | 0.0027 | 0.428 | 0.012 | 0.5 | — | — |
| Example 18 | 0.01 | 0.033 | 0.0003 | 0.428 | 0.012 | 0.5 | — | — |
| Example 19 | 0.01 | 0.033 | 0.0167 | 0.428 | 0.012 | 0.5 | — | — |
| Example 20 | 0.01 | 0.033 | 0.0027 | 0.2 | 0.012 | 0.5 | — | — |
| Comparative Example 1 | 0.17 | 0.05 | 0.003 | 0.45 | 0.012 | 12.6 | — | — |
| Comparative Example 2 | 0.03 | 0.05 | 0.02 | 0.45 | 0.012 | 16.1 | — | — |
| Comparative Example 3 | 0.03 | 0.05 | 0.003 | 0.7 | 0.012 | 20.5 | — | — |
| Comparative Example 4 | 0.03 | 0.05 | 0.003 | 0.45 | 0.13 | 14.4 | — | — |
| Comparative Example 5 | 0.03 | 0.05 | 0.003 | 0.45 | 0.012 | 23.7 | — | — |
| Comparative Example 6 | 0.03 | 0.05 | 0.003 | 0.45 | 0.012 | 7.3 | Mg | 67 |
| Comparative Example 7 | 0.03 | 0.05 | 0.003 | 0.45 | 0.012 | 5.8 | Ti | 130 |
| Comparative Example 8 | 0.03 | 0.05 | 0.003 | 0.45 | 0.012 | 9.7 | Ni | 160 |

TABLE 4

| | Relative Fluorescence Intensity (%) | Afterglow after 3 ms |
|---|---|---|
| Example 1 | 87 | 455 |
| Example 2 | 95 | 788 |
| Example 3 | 80 | 634 |
| Example 4 | 84 | 158 |
| Example 5 | 88 | 664 |
| Example 6 | 84 | 782 |
| Example 7 | 100 | 68 |
| Example 8 | 98 | 769 |
| Example 9 | 103 | 655 |
| Example 10 | 107 | 502 |
| Example 11 | 91 | 620 |
| Example 12 | 103 | 515 |
| Example 13 | 87 | 431 |
| Example 14 | 102 | 767 |
| Example 15 | 86 | 746 |
| Example 16 | 98 | 81 |
| Example 17 | 81 | 88 |
| Example 18 | 81 | 798 |
| Example 19 | 82 | 62 |
| Example 20 | 80 | 88 |
| Comparative Example 1 | 75 | 992 |
| Comparative Example 2 | 79 | 1229 |
| Comparative Example 3 | 64 | 2942 |
| Comparative Example 4 | 99 | 1218 |
| Comparative Example 5 | 104 | 1742 |
| Comparative Example 6 | 66 | 822 |
| Comparative Example 7 | 64 | 676 |
| Comparative Example 8 | 64 | 1022 |

Examples 21 to 24 were also performed. These examples differed from example 1 in conditions for heat treatment of $Al_2O_3$ powder and in conditions for pulverization using a ball mill to be performed after the heat treatment.

Example 21 had a heat treatment temperature of 1330° C. The duration thereof was 1 h. The temperature was lower than that in example 1. Duration of pulverization in example 21 was 3 h. The duration was shorter than that in example 1.

Example 22 had a heat treatment temperature of 1400° C. The duration thereof was 1 h. Duration of pulverization in example 22 was 3 h. The duration was shorter than that in example 1.

Example 23 had a heat treatment temperature of 1300° C. The duration thereof was 1 h. The temperature was lower than that in example 1. Duration of pulverization in example 23 was 30 h. The duration was longer than that in example 1.

Example 24 had a heat treatment temperature of 1400° C. The duration thereof was 1 h. Duration of pulverization in example 24 was 30 h. The duration was longer than that in example 1.

In examples 21 and 22, the relative fluorescence intensity and the level of afterglow 3 ms after the termination of X-ray radiation were equivalent to those in example 1. In examples 23 and 24, the relative fluorescence intensity was equivalent to that in example 1. In these examples, the level of afterglow 3 ms after the termination of X-ray radiation was greater than that in example 1. However, the level could be held to as low as 750 ppm. These results reflect the content of Si in the powder made of an $Al_2O_3$ raw material.

LIST OF REFERENCE NUMBERS

1: X-ray source
2: scintillater
3: light reflection film
4: wiring substrate
5: silicon photodiode

The invention claimed is:

1. A fluorescent material comprising:
Ce, the Ce acting as an activator;
  at least Gd, Al, Ga, O, Si, and a component M;
  wherein the component M is at least one of Mg, Ti, Ni;
  wherein the composition of the material is expressed by the general formula:

$(Gd_{1-x-z}Lu_xCe_z)_{3+a}(Al_{1-u-a}Ga_uSc_s)_{5-a}O_{12}$ wherein
  $0 \leq a \leq 0.15$,
  $0x \leq 0.5$,
  $0.0003 \leq z \leq 0.0167$,
  $0.2 \leq u \leq 0.6$, and
  $0 \leq s \leq 0.1$; and
  wherein, regarding the concentrations of Si and the component M,
  $0.5 \leq$ Si concentration (mass ppm) $\leq 10$, and
  $0 \leq$ M concentration (mass ppm) $\leq 50$.

2. The fluorescent material according to claim 1, wherein, for the value a, $0.005 \leq a \leq 0.05$.

3. A scintillator made of a fluorescent material according to claim 2.

4. The fluorescent material according to claim 1, wherein, for the value x, $0.03 \leq x \leq 0.2$.

5. A scintillator made of a fluorescent material according to claim 4.

6. The fluorescent material according to claim 1, wherein, for the value z, $0.001 \leq z \leq 0.005$.

7. A scintillator made of a fluorescent material according to claim 6.

8. The fluorescent material according to claim 1, wherein, for the value u, $0.35 \leq u \leq 0.55$.

9. The fluorescent material according to claim 1, wherein, for the value s, $0.01 \leq s \leq 0.1$.

10. The fluorescent material according claim 1, wherein $0.5 \leq$ Si concentration (mass ppm) $\leq 5$.

11. The fluorescent material according claim 1, wherein $3 \leq$ M concentration (mass ppm) $\leq 15$.

12. The fluorescent material according to claim 1, wherein the fluorescent material is polycrystalline.

13. A scintillator made of a fluorescent material according to claim 1.

14. The scintillator according to claim 13, wherein the scintillator has a thickness of 0.5 to 5 mm.

15. A radiation detector comprising:
  a scintillator according to claim 14; and
  a light receiving element, the element designed to detect fluorescent light emitted from the scintillator.

16. A radiation detector comprising:
  a scintillator according to claims 13; and
  a light receiving element, the element designed to detect fluorescent light emitted from the scintillator.

17. A fluorescent material for a scintillator having a garnet structure, the material comprising:
  Ce, Gd, Ga, Al, O, Si, and a component M;
  wherein Ce acts as an activator;
  wherein:
  $24.3 \leq$ Gd concentration (mass %) $\leq 57.6$,
  $0 \leq$ Lu concentration (mass %) $\leq 31.1$,
  $0.02 \leq$ Ce concentration (mass %) $\leq 0.7$,
  $4.0 \leq$ Al concentration (mass %) $\leq 12.8$,
  $7.5$ Ga concentration (mass %) $\leq 22.6$,
  $0 \leq$ Sc concentration (mass %) $\leq 2.64$,
  $19.6 \leq$ O concentration (mass %) $\leq 22.8$,
  $0.5 \leq$ Si concentration (mass ppm) $\leq 10$, and
  $0 \leq$ M concentration (mass ppm) $\leq 50$,
  wherein the component M is at least one of Mg, Ti, and Ni; and
  wherein the sum of all the elements is set at 100 mass %.

18. The fluorescent material according to claim 17, wherein the fluorescent material is polycrystalline.

19. A fluorescent material for a scintillator having a garnet structure, the material comprising:
  Ce, Gd, Ga, Al, O, Si, and a component M;
  wherein Ce acts as an activator,
  wherein:
  $45.9 \leq$ Gd concentration (mass %) $\leq 52.8$,
  $1.7 \leq$ Lu concentration (mass %) $\leq 12.0$,
  $0.06 \leq$ Ce concentration (mass %) $\leq 0.24$,
  $7.0 \leq$ Al concentration (mass %) $\leq 10.0$,
  $13.7 \leq$ Ga concentration (mass %) $\leq 20.6$,
  $0.05 \leq$ Sc concentration (mass %) $\leq 0.5$,
  $20.7 \leq$ O concentration (mass %) $\leq 21.9$,
  $0.5 \leq$ Si concentration (mass ppm) $\leq 5$, and
  $3 \leq$ M concentration (mass ppm) $\leq 15$;
  wherein the component M is at least one of Mg, Ti, and Ni, and
  wherein the sum of all the elements is set at 100 mass %.

20. The fluorescent material according to claim 19, wherein the fluorescent material is polycrystalline.

* * * * *